(12) United States Patent
Maschmeyer et al.

(10) Patent No.: US 11,888,164 B2
(45) Date of Patent: Jan. 30, 2024

(54) BATTERY WITH HALOGEN SEQUESTERING AGENT

(71) Applicant: GELION TECHNOLOGIES PTY LTD, New South Wales (AU)

(72) Inventors: Thomas Maschmeyer, New South Wales (AU); Nathan Coad, Western Australia (AU); Thomas Ellis, New South Wales (AU); Shufeng Zhao, New South Wales (AU); Brian Stanley Hawkett, New South Wales (AU); Duc Ngoc Nguyen, New South Wales (AU); The Vien Huynh, New South Wales (AU)

(73) Assignee: Gelion Technologies Pty Ltd, New South Wales (AU)

( * ) Notice: Subject to any disclaimer, the term of this patent is extended or adjusted under 35 U.S.C. 154(b) by 0 days.

(21) Appl. No.: 17/274,892

(22) PCT Filed: Sep. 12, 2019

(86) PCT No.: PCT/AU2019/050980
§ 371 (c)(1),
(2) Date: Mar. 10, 2021

(87) PCT Pub. No.: WO2020/051642
PCT Pub. Date: Mar. 19, 2020

(65) Prior Publication Data
US 2022/0059846 A1    Feb. 24, 2022

(30) Foreign Application Priority Data

Sep. 12, 2018 (AU) .................. 2018903432

(51) Int. Cl.
*H01M 4/62* (2006.01)
*C08F 259/04* (2006.01)
(Continued)

(52) U.S. Cl.
CPC ........... *H01M 4/628* (2013.01); *C08F 259/04* (2013.01); *C08F 271/00* (2013.01); *H01M 4/663* (2013.01);
(Continued)

(58) Field of Classification Search
CPC .... H01M 4/628; H01M 4/663; H01M 8/0239; H01M 8/0245; H01M 8/188; C08F 259/04; C08F 271/00
See application file for complete search history.

(56) References Cited

U.S. PATENT DOCUMENTS 2,566,114 A    8/1951  Bloch
3,738,870 A    6/1973  De Rossi
(Continued)

FOREIGN PATENT DOCUMENTS

CN    102790228 A    11/2012
EP    3352293 A1     7/2018
(Continued)

OTHER PUBLICATIONS

Mastragostino and Valcher, Electrochimica Acta, 1983, 28, p. 501-505, Apr. 1983.
(Continued)

*Primary Examiner* — Karie O'Neill Apicella
(74) *Attorney, Agent, or Firm* — Lathrop GPM LLP; Wm. Tucker Griffith

(57) ABSTRACT

The present specification relates to a battery, comprising an anode, a cathode, an electrolyte disposed between the anode and the cathode, a halogen in contact with the cathode, and a metal in contact with the anode, wherein the halogen is in contact with a polymeric halogen sequestering agent (HSA) which is a polymer comprising a moiety capable of sequestering the halogen.

13 Claims, 18 Drawing Sheets

(51) Int. Cl.

| | | |
|---|---|---|
| *C08F 271/00* | (2006.01) | |
| *H01M 4/66* | (2006.01) | |
| *H01M 8/0239* | (2016.01) | |
| *H01M 8/0245* | (2016.01) | |
| *H01M 8/18* | (2006.01) | |
| *H01M 4/02* | (2006.01) | |

(52) U.S. Cl.
CPC ....... *H01M 8/0239* (2013.01); *H01M 8/0245* (2013.01); *H01M 8/188* (2013.01); *C08F 2800/20* (2013.01); *C08F 2810/20* (2013.01); *H01M 2004/021* (2013.01); *H01M 2004/028* (2013.01)

(56) References Cited

U.S. PATENT DOCUMENTS

| | | | |
|---|---|---|---|
| 3,897,309 A | 7/1975 | Grabner | |
| 4,029,854 A | 6/1977 | Walsh et al. | |
| 4,038,459 A * | 7/1977 | Ajami | H01M 8/184 |
| | | | 429/70 |
| 4,592,971 A * | 6/1986 | Walsh | H01M 10/365 |
| | | | 429/105 |
| 4,637,968 A * | 1/1987 | Grimes | H01M 12/085 |
| | | | 429/105 |
| 2004/0265685 A1 | 12/2004 | Popov et al. | |
| 2013/0288157 A1 | 10/2013 | Choi et al. | |
| 2014/0186696 A1 | 7/2014 | Onagi et al. | |

FOREIGN PATENT DOCUMENTS

| | | |
|---|---|---|
| JP | H01-151155 A | 6/1989 |
| WO | 2020051642 | 3/2020 |

OTHER PUBLICATIONS

PCT Application No. PCT/AU2019/050980, International Search Report, dated Nov. 12, 2019, 3 pages.
PCT Application No. PCT/AU2019/050980, International Preliminary Report on Patentability, dated Jan. 6, 2021, 6 pages.
EP Application No. 19860938.0, European Extended Search Report, dated Apr. 22, 2021, 4 pages.
JP Application No. 2021-513770, Office Action dated Sep. 26, 2023.

* cited by examiner

| |
|---|
| terminal anode |
| anode active layer and electrolyte 1 |
| semipermeable barrier with polymeric HSA |
| Cathode active layer and electrolyte 2 |
| bipolar electrode |
| Anode active layer and electrolyte 1 |
| semipermeable barrier with polymeric HSA |
| Cathode active layer and electrolyte 2 |
| terminal cathode |

Figure 1 (Continued).

BATTERY WITH HALOGEN SEQUESTERING AGENT

CROSS-REFERENCE TO RELATED APPLICATIONS

This application is a national phase entry under 35 U.S.C. § 371 of PCT/AU2019/050980 filed on Sep. 12, 2019, which claims priority to Australian provisional application AU 2018903432 filed on Sep. 12, 2018. The contents of each of the aforementioned patent applications are hereby incorporated by reference in their entirety.

FIELD

The present invention relates to energy storage and generation, in particular batteries.

BACKGROUND

Flow batteries have long been considered to be the most suitable storage technology for utility applications due to their potential long life, deep discharge characteristics and potential low manufacturing cost. Flow batteries differ from other battery technologies in that the electrolyte is pumped over the electrodes, which remain electrochemically inert, storing charge through a change in oxidation state (e.g. vanadium redox) or through an electrodeposition such as the zinc-bromine battery. Of these, the zinc-bromine battery (ZBB) offers a solution to most of the problems that have challenged flow battery systems and is considered a highly prospective technology.

A zinc-bromine flow battery consists of two cells separated by a permeable membrane through which an aqueous zinc bromide/bromine electrolyte is circulated. During the charging step, zinc is electroplated on the carbon anode, and $Br_2$ is evolved at the carbon cathode. A molecular complexing agent dissolved in the electrolyte, such as N-ethyl-N-methylpyrrolidiniumbromide (MEPBr), is used to reduce the reactivity and vapour pressure of the elemental $Br_2$ by complexing the majority of the $Br_2$ to MEPBr, forming a so-called polybromide complex ($MEPBr_n$). This reduces the self-discharge of the battery and improves the safety of the system. This complex is removed from the electrodes via the flowing electrolyte and is stored in an external reservoir. On discharge, the complex is returned to the battery stacks by the operation of a valve or a third pump. Zinc is oxidized to zinc ions on the anodes; the $Br_2$ is released from the complex and subsequently reduced to $Br^-$ ions on the cathodes. Such system may also be operated with various metals and halides other than zinc and bromine.

The high solubility of halides, particularly chlorine and bromine, in aqueous solution, leads to critical technical challenges in halide-based batteries, as the crossover of the halide from the cathode to the anode causes self-discharge and reduces battery efficiency. The battery must therefore contain some means for confining the halide to the cathode side of the battery. One known example of such a means is a semipermeable barrier, which permits the exchange of electrolyte ions but not of the halogen. However, such existing systems have numerous disadvantages.

For example, in the past a microporous membrane has been typically used to reduce crossover of halide from the cathode side of the battery to the anode side. An alternative option has been to use an ion-exchange membrane, which is an ionically conductive but electrically non-conductive barrier. These may be used in conjunction with a molecular complexing agent dissolved in the electrolyte such as MEPBr. However, existing systems utilizing a microporous battery membrane or an ion-exchange membrane, and/or dissolved molecular complexing agent have a number of disadvantages including the high cost of existing membrane materials (in particular ion-exchange membranes), the accumulation of a high concentration of complexed polybromide ions which forms an oily phase near the cathode, and insufficient suppression of bromine crossover.

Therefore, there is a need for a means of confining the halogen to the cathode side of the battery, without the disadvantages which accompany existing systems. An object of the present invention is to overcome one or more of the disadvantages of existing systems such as those outlined above.

SUMMARY OF INVENTION

In a first aspect of the invention, there is provided a battery, comprising an anode, a cathode, an electrolyte disposed between the anode and the cathode, a halogen in contact with the cathode, and a metal in contact with the anode, wherein the halogen is in contact with a polymeric halogen sequestering agent (HSA) which is a polymer comprising a moiety capable of sequestering the halogen.

The following options may be used in conjunction with the first aspect, either individually or in any suitable combination.

During discharge the halogen may be reduced at the cathode and the metal may be oxidised at the anode.

The halogen may be complexed with the polymeric HSA.

In a second aspect of the invention, there is provided a discharged battery, comprising an anode, a cathode, an electrolyte, a halide, wherein the halide is in contact with the cathode, and a metal cation, wherein the metal cation is in contact with the anode, wherein the halide is in contact with the polymeric halogen sequestering agent (HSA), which is a polymer comprising a moiety capable of sequestering the halogen of the halide.

The following options may be used in conjunction with the second aspect, either individually or in any suitable combination.

During charging the halide may be oxidised at the cathode and the metal may be reduced at the anode.

The following options may be used in conjunction with the first or second aspects, either individually or in any suitable combination.

The moiety capable of sequestering the halogen may be a quaternary ammonium halide group, a phosphonium halide group, or a sulfonium halide group. The moiety capable of sequestering the halogen may be a quaternary ammonium halide group.

The electrolyte may be an aqueous electrolyte. Alternatively, the electrolyte may be a non-aqueous electrolyte. The electrolyte may be a gel electrolyte.

The battery may further comprise at least one semipermeable barrier disposed between the anode and the cathode. In this case, the polymeric HSA may be disposed on the at least one semipermeable barrier. The polymeric HSA may be disposed on a cathode-facing surface of the semipermeable barrier or an anode-facing surface of the semipermeable barrier, or on both faces of the semipermeable barrier. The polymeric HSA may be distributed throughout the semipermeable barrier. The battery may comprise two or more semipermeable barriers disposed between the anode and the cathode. Alternatively, the battery may comprise no more than one semipermeable barrier which is a spacer. The battery may comprise no more than two semipermeable barriers, wherein the at least one semipermeable barrier on which the polymeric HSA is disposed is a membrane, and the second semipermeable barrier is a spacer.

The semipermeable barrier may comprise one or more of a cellulose-based material, liquid crystal polymer, fiber glass, polyolefin, a fibre composite, a sponge, a fabric, porous ceramic, gelated liquid, polyethylene, or a halogenated polymer. The semipermeable barrier may comprise paper. The semipermeable barrier comprises poly(vinylchloride) (PVC), polytetrafluoroethylene (PTFE), or polyvinylidene fluoride (PvDF).

The battery may not comprise a semipermeable barrier disposed between the anode and the cathode.

The cathode may comprise a cathode active layer, wherein the polymeric HSA is distributed in and/or on the cathode active layer. The cathode active layer may comprise a graphitizing carbon material. The cathode active layer may comprise a carbon material having a surface area greater than 70 cm$^2$/cm$^3$. The cathode active layer may comprise carbon felt, carbon foam, packed carbon powder, expanded graphite, aerogel carbon, xerogel carbon, or sol-gelated carbon. The cathode active layer may comprise carbon felt or packed carbon powder. In this case, the carbon powder may be activated carbon, carbon black, expanded graphite, graphite, or a combination of two or more thereof. The cathode active layer may comprise packed carbon powder and not comprise a polymeric binder.

The metal may be selected from the group consisting of Zn, Mg, Li, K, Ca, Fe, Ni, and Al. The metal may be Zn. The halogen may be selected from the group consisting of fluorine, chlorine, bromine, and iodine or the halide may be selected from the group consisting of fluoride, chloride, bromide, and iodide. The halogen may be bromine or the halide may be bromide.

The polymeric HSA may be a polymer of a compound of Formula (I):

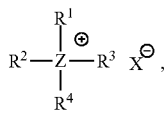

wherein
Z is N, P or S,
R$^1$ is allyl or vinyl,
R$^2$ is selected from the group consisting of allyl, vinyl, and optionally substituted branched or unbranched C$_1$ to C$_{18}$ alkyl, and X$^-$ is Cl$^-$, I$^-$, Br$^-$, F$^-$, SCN$^-$, OCN$^-$, OH$^-$, C$_2$O$_4^{2-}$, HCOO$^-$, HCO$_3^-$, CO$_3^{2-}$, OCl$^-$, OBr$^-$, BrO$_3^-$, ClO$_3^-$, SO$_3^{2-}$, NO$^{2-}$, IO$_3^-$, H$_2$PO$_4^-$, HPO$_4^{2-}$, SO$_4^-$, NO$_3^-$, ClO$_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof, or
R$^2$ and X$^-$ are absent, and
R$^3$ and R$^4$ are each independently selected from allyl, vinyl, optionally substituted branched or unbranched C$_1$ to C$_{18}$ alkyl, or
R$^3$ and R$^4$ are joined to form a 4, 5, or 6-membered ring together with Z, optionally comprising one or more heteroatoms selected from the group consisting of O, P and N, wherein said ring is optionally substituted, wherein each optional substituent is independently selected from the group consisting of allyl, vinyl, branched and unbranched C$_1$ to C$_{18}$ alkyl, Cl, Br, I, F, —OR$^5$, —NR$^5$R$^6$, —N$^+$R$^5$R$^6$R$^7$, —SR$^5$, —COOR$^5$, and carbonyl,
wherein R$^5$, R$^6$ and R$^7$ are each independently selected from branched or unbranched C$_1$ to C$_{18}$ alkyl or H, and any two of R$^5$, R$^6$ and R$^7$ are optionally joined to form a 4, 5, or 6-membered ring together with N. In this case, R$^2$ may be selected from the group consisting of allyl, vinyl, and branched or unbranched C$_1$ to C$_5$ alkyl, and R$^3$ and R$^4$ may each be independently selected from allyl, vinyl, and branched or unbranched C$_1$ to C$_5$ alkyl, or R$^3$ and R$^4$ may be joined to form a 5, or 6-membered ring together with Z, wherein said ring is optionally substituted with carbonyl; or R$^3$ and R$^4$ may be joined to form a 5, or 6-membered ring together with Z, wherein said ring may be optionally substituted with carbonyl, and R$^2$ is absent.

The polymeric HSA may be a polymer or co-polymer of a compound of Formula (II):

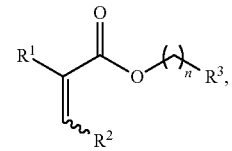

wherein
R$^1$ is H or methyl,
R$^2$ is H or CH$_2$Z$^+$R$^4$R$^5$R$^6$X$^-$,
wherein when R$^2$ is H, R$^3$ is CH$_2$Z$^+$R$^4$R$^5$R$^6$X$^-$, and when R$^2$ is CH$_2$Z$^+$R$^4$R$^5$R$^6$X$^-$, R$^3$ is branched or unbranched C$_1$ to C$_{12}$ alkyl, and
wherein R$^4$, R$^5$ and R$^6$ are independently selected from branched or unbranched C$_1$ to C$_{12}$ alkyl, or R$^4$ and R$^5$ are joined to form a 5, or 6-membered ring together with Z and R$^6$ is branched or unbranched C$_1$ to C$_{12}$ alkyl, and
wherein X$^-$ is Cl$^-$, I$^-$, Br$^-$, F$^-$, SCN$^-$, OCN$^-$, OH$^-$, C$_2$O$_4^{2-}$, HCOO$^-$, HCO$_3^-$, CO$_3^{2-}$, OCl$^-$, OBr$^-$, BrO$_3^-$, ClO$_3^-$, SO$_3^{2-}$, NO$^{2-}$, IO$_3^-$, H$_2$PO$_4^-$, HPO$_4^{2-}$, SO$_4^-$, NO$_3^-$, ClO$_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof, or
R$^6$ and X$^-$ are absent,
wherein Z is N, P or S, and
n is 2, 3, 4, 5, 6, 7, 8, 9, 10, 11, or 12.

The polymeric HSA may be a polymer or co-polymer of a compound of Formula (III):

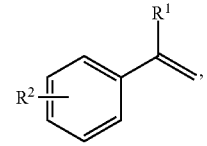

wherein
R$^1$ is H or methyl, and
R$^2$ is CH$_2$Z$^+$R$^3$R$^4$R$^5$X$^-$ or Z$^+$R$^3$R$^4$R$^5$X$^-$,
wherein R$^3$, R$^4$ and R$^5$ are independently selected from branched or unbranched C$_1$ to C$_{12}$ alkyl, or R$^3$ and R$^4$ are joined to form a 5, or 6-membered ring together with Z and $R^5$ is branched or unbranched $C_1$ to $C_{12}$ alkyl, and wherein $X^-$ is $Cl^-$, $I^-$, $Br^-$, $F^-$, $SCN^-$, $OCN^-$, $OH^-$, $C_2O_4^{2-}$, $HCOO^-$, $HCO_3^-$, $CO_3^{2-}$, $OCl^-$, $OBr^-$, $BrO_3^-$, $ClO_3^-$, $SO_3^{2-}$, $NO_2^-$, $IO_3^-$, $H_2PO_4^-$, $HPO_4^{2-}$, $SO_4^-$, $NO_3^-$, $ClO_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof, or $R^5$ and $X^-$ are absent, and wherein Z is N, P or S.

Where the polymeric HSA is a polymer or co-polymer of a compound of Formula (I), Formula (II), or Formula (III), Z may be N.

The polymeric HSA may be a polymer or co-polymer of a compound of Formula (IV):

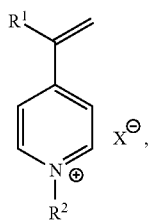

wherein
$R^1$ is H or methyl,
$R^2$ is optionally substituted branched or unbranched $C_1$ to $C_{18}$ alkyl, wherein each optional substituent is independently selected from the group consisting of vinyl, allyl, branched and unbranched $C_1$ to $C_{18}$ alkyl, Cl, Br, I, F, $-OR_5$, $-NR^5R^6$, $-N^+R^5R^6R^7$, $-SR_5$, $-COOR_5$, and carbonyl,
wherein $R^5$, $R^6$ and $R^7$ are each independently selected from branched or unbranched $C_1$ to $C_{18}$ alkyl or H, and any two of $R^5$, $R^6$ and $R^7$ are optionally joined to form a 4, 5, or 6-membered ring together with N, and
$X^-$ is $Cl^-$, $I^-$, $Br^-$, $F^-$, $SCN^-$, $OCN^-$, $OH^-$, $C_2O_4^{2-}$, $HCOO^-$, $HCO_3^-$, $CO_3^{2-}$, $OCl^-$, $OBr^-$, $BrO_3^-$, $ClO_3^-$, $SO_3^{2-}$, $NO_2^-$, $IO_3^-$, $H_2PO_4^-$, $HPO_4^{2-}$, $SO_4^-$, $NO_3^-$, $ClO_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof. In this case, $R^1$ may be H, and $R^2$ may be optionally substituted branched or unbranched $C_1$ to $C_5$ alkyl. $R^2$ may be substituted with —OH.

The polymeric HSA may be a polymer or co-polymer of a compound selected from the group consisting of diallyldimethyl ammonium halide (DADMAC), triallymethyl ammonium halide (TAMA), triallyl (2-hydroxyethyl) ammonium halide (TAHEA), diallyl ethyl (2-hydroxy ethyl) ammonium halide (DAEHEA), 1-(2-hydroxyethyl)-4-vinyl pyridinium halide (HEVP), 1-ethyl-4-vinyl pyridinium halide (EVP), vinylalkylpyrrolidinium halide (VAP), vinylpyrrolidone, allylalkylpyrrolidionium halide, diallylpyrrolidinium halide, N,N-dimethylaminoethyl methacrylate, N,N-diethylaminoethyl methacrylate, [2-(methacryloyloxy)ethyl]trimethylammonium halide, [2-(methacryloyloxy)ethyl]triethylammonium halide, N,N-dimethylaminoethyl acrylate, N,N-diethylaminoethyl acrylate, [2-(acryloyloxy)ethyl]trimethylammonium halide, [2-(acryloyloxy)ethyl]triethylammonium halide, dimethylamino alpha-methylstyrene and isomers and methyl halide quaternary salts thereof, diethylamino alpha-methylstyrene and isomers and ethyl halide quaternary salts thereof, (vinylbenzyl)trimethylammonium halide, (vinylbenzyl)triethylammonium halide, (vinylbenzyl)dimethylamine, (vinylbenzyl)diethylamine, tetraallyl ammonium halide (TAA), and tetraallyl piperazinium halide (TAP). The polymeric HSA may be a polymer or co-polymer of a compound selected from the group consisting of diallyldimethyl ammonium halide (DADMAC), triallymethyl ammonium halide (TAMA), triallyl (2-hydroxyethyl) ammonium halide (TAHEA), diallyl ethyl (2-hydroxy ethyl) ammonium halide (DAEHEA), 1-(2-hydroxyethyl)-4-vinyl pyridinium halide (HEVP), and 1-ethyl-4-vinyl pyridinium halide (EVP). The polymeric HSA may be a polymer or co-polymer of diallyldimethyl ammonium halide (DADMAC).

The polymeric HSA may be a co-polymer or graft polymer of at least two different compounds of Formula (I), Formula (II), Formula (III), and/or Formula (IV). The polymeric HSA may be a co-polymer of diallyldimethyl ammonium halide (DADMAC) and triallymethyl ammonium halide (TAMA).

The polymeric HSA may comprise a functional co-monomer. The functional co-monomer may be selected from the group consisting of 2-hydroxyethyl acrylate (HEA), acrylamide, and glycidyl methacrylate (GMA).

The polymeric HSA may also comprise a cross-linker. The cross-linker may be selected from the group consisting of bisacrylamide, ethylene glycol dimethylacrylate, tetraallyl piperazinium halide salts, tetraallyl ammonium halide salts, tetraallylethylenediamine and quaternized halide salts thereof, 1,3-bis(diallylamino) propane and quaternized halide salts thereof, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth) acrylate, glycerol allyloxy di(meth)acrylate, (hydroxymethyl)ethane di(meth)acrylate, 1,1,1-tris (hydroxymethyl)ethane tri(meth)acrylate, 1,1,1-tris (hydroxymethyl) propane di(meth)acrylate, 1,1,1-tris (hydroxymethyl) propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, oleyl maleate, glyceryl propoxy triacrylate, allyl methacrylate, methacrylic anhydride and methylenebis (meth)acrylamide.

The polymeric HSA may be not soluble in the electrolyte. Alternatively, the polymeric HSA may be soluble in the electrolyte.

In the battery of the first or second aspect of the invention, the oxidant crossover may be reduced by up to 70% over 5 hours compared to an equivalent battery without a polymeric HSA, as measured by discharge of the battery.

In a third aspect of the invention, there is provided use of a polymeric HSA to reduce oxidant crossover in a battery; wherein the battery comprises an anode, a cathode, an electrolyte disposed between the anode and the cathode, a halogen in contact with the cathode, and a metal in contact with the anode; and wherein the halogen is in contact with a polymeric halogen sequestering agent (HSA) which is a polymer comprising a moiety capable of sequestering the halogen.

In a fourth aspect of the invention, there is provided use of a polymeric halogen sequestering agent (HSA) which is a polymer comprising a moiety capable of sequestering a halogen, in the production of a battery, wherein the battery comprises an anode, a cathode, an electrolyte disposed between the anode and the cathode, a halogen in contact with the cathode, and a metal in contact with the anode; wherein the halogen is in contact with the polymeric HSA.

In a fifth aspect of the invention, there is provided a method of producing a battery, the method comprising providing an anode and a cathode, providing an electrolyte disposed between the anode and the cathode, placing a metal in contact with the anode, and placing the halogen in contact with the cathode and in contact with a polymeric halogen sequestering agent (HSA) which is a polymer comprising a moiety capable of sequestering a halogen.

The following options may be used in conjunction with the third to fifth aspects, either individually or in any suitable combination.

During discharge the halogen may be reduced at the cathode and the metal may be oxidised at the anode.

The halogen may be complexed with the polymeric HSA.

The moiety capable of sequestering the halogen may be a quaternary ammonium halide group, a phosphonium halide group, or a sulfonium halide group. The moiety capable of sequestering the halogen may be a quaternary ammonium halide group.

The electrolyte may be an aqueous electrolyte. Alternatively, the electrolyte may be a non-aqueous electrolyte. The electrolyte may be a gel electrolyte.

The battery may further comprise at least one semipermeable barrier disposed between the anode and the cathode. In this case, the polymeric HSA may be disposed on the at least one semipermeable barrier. The polymeric HSA may be disposed on a cathode-facing surface of the semipermeable barrier or an anode-facing surface of the semipermeable barrier, or on both faces of the semipermeable barrier. The polymeric HSA may be distributed throughout the semipermeable barrier. The battery may comprise two or more semipermeable barriers disposed between the anode and the cathode. Alternatively, the battery may comprise no more than one semipermeable barrier which is a spacer. The battery may comprise no more than two semipermeable barriers, wherein the at least one semipermeable barrier on which the polymeric HSA is disposed is a membrane, and the second semipermeable barrier is a spacer.

The semipermeable barrier may comprise one or more of a cellulose-based material, liquid crystal polymer, fiber glass, polyolefin, a fibre composite, a sponge, a fabric, porous ceramic, gelated liquid, polyethylene, or a halogenated polymer. The semipermeable barrier may comprise paper. The semipermeable barrier comprises poly(vinylchloride) (PVC), polytetrafluoroethylene (PTFE), or polyvinylidene fluoride (PvDF).

The battery may not comprise a semipermeable barrier disposed between the anode and the cathode.

The cathode may comprise a cathode active layer, wherein the polymeric HSA is distributed in and/or on the cathode active layer. The cathode active layer may comprise a graphitizing carbon material. The cathode active layer may comprise a carbon material having a surface area greater than 70 cm$^2$/cm$^3$. The cathode active layer may comprise carbon felt, carbon foam, packed carbon powder, expanded graphite, aerogel carbon, xerogel carbon, or sol-gelated carbon. The cathode active layer may comprise carbon felt or packed carbon powder. In this case, the carbon powder may be activated carbon, carbon black, expanded graphite, graphite, or a combination of two or more thereof. The cathode active layer may comprise packed carbon powder and not comprise a polymeric binder.

The metal may be selected from the group consisting of Zn, Mg, Li, K, Ca, Fe, Ni, and Al. The metal may be Zn. The halogen may be selected from the group consisting of fluorine, chlorine, bromine, and iodine or the halide may be selected from the group consisting of fluoride, chloride, bromide, and iodide. The halogen may be bromine or the halide may be bromide.

The polymeric HSA may be a polymer of a compound of Formula (I):

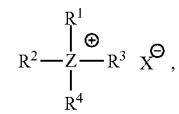

wherein

Z is N, P or S,

R$^1$ is allyl or vinyl,

R$^2$ is selected from the group consisting of allyl, vinyl, and optionally substituted branched or unbranched C$_1$ to C$_{18}$ alkyl, and X$^-$ is Cl$^-$, I$^-$, Br$^-$, F$^-$, SCN$^-$, OCN$^-$, OH$^-$, C$_2$O$_4^{2-}$, HCOO$^-$, HCO$_3^-$, CO$_3^{2-}$, OCl$^-$, OBr$^-$, BrO$_3^-$, ClO$_3^-$, SO$_3^{2-}$, NO$_{2-}$, IO$_3^-$, H$_2$PO$_4$-, HPO$_4^{2-}$, SO$_4^-$, NO$_3^-$, ClO$_4^-$, bis(trifluoromethylsulfonyl)imide, bis(fluorosulfonyl)imide, hexafluorophosphate, tetrafluoroborate, tris(pentafluoro)trifluorophosphate, acetate, propionate, pentanoate, hexanoate, or a combination thereof, or R$^2$ and X$^-$ are absent, and R$^3$ and R$^4$ are each independently selected from allyl, vinyl, optionally substituted branched or unbranched C$_1$ to C$_{18}$ alkyl, or R$^3$ and R$^4$ are joined to form a 4, 5, or 6-membered ring together with Z, optionally comprising one or more heteroatoms selected from the group consisting of O, P and N, wherein said ring is optionally substituted, wherein each optional substituent is independently selected from the group consisting of allyl, vinyl, branched and unbranched C$_1$ to C$_{18}$ alkyl, Cl, Br, I, F, —OR$^5$, —NR$^5$R$^6$, —N$^+$R$^5$R$^6$R$^7$, —SR$^5$, —COOR$^5$, and carbonyl, wherein R$^5$, R$^6$ and R$^7$ are each independently selected from branched or unbranched C$_1$ to C$_{18}$ alkyl or H, and any two of R$^5$, R$^6$ and R$^7$ are optionally joined to form a 4, 5, or 6-membered ring together with N. In this case, R$^2$ may be selected from the group consisting of allyl, vinyl, and branched or unbranched C$_1$ to C$_5$ alkyl, and R$^3$ and R$^4$ may each be independently selected from allyl, vinyl, and branched or unbranched C$_1$ to C$_5$ alkyl, or R$^3$ and R$^4$ may be joined to form a 5, or 6-membered ring together with Z, wherein said ring is optionally substituted with carbonyl; or R$^3$ and R$^4$ may be joined to form a 5, or 6-membered ring together with Z, wherein said ring may be optionally substituted with carbonyl, and R$^2$ is absent.

The polymeric HSA may be a polymer or co-polymer of a compound of Formula (II):

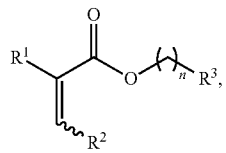

wherein
- $R^1$ is H or methyl,
- $R^2$ is H or $CH_2Z^+R^4R^5R^6X^-$,
- wherein when $R^2$ is H, $R^3$ is $CH_2Z^+R^4R^5R^6X^-$, and when $R^2$ is $CH_2Z^+R^4R^5R^6X^-$, $R^3$ is branched or unbranched $C_1$ to $C_{12}$ alkyl, and
- wherein $R^4$, $R^5$ and $R^6$ are independently selected from branched or unbranched $C_1$ to $C_{12}$ alkyl, or $R^4$ and $R^5$ are joined to form a 5, or 6-membered ring together with Z and $R^6$ is branched or unbranched $C_1$ to $C_{12}$ alkyl, and
- wherein $X^-$ is $Cl^-$, $I^-$, $Br^-$, $F^-$, $SCN^-$, $OCN^-$, $OH^-$, $C_2O_4^{2-}$, $HCOO^-$, $HCO_3^-$, $CO_3^{2-}$, $OCl^-$, $OBr^-$, $BrO_3^-$, $ClO_3^-$, $SO_3^{2-}$, $NO^{2-}$, $IO_3^-$, $H_2PO_4^-$, $HPO_4^{2-}$, $SO_4^-$, $NO_3^-$, $ClO_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof, or
- $R^6$ and $X^-$ are absent,
- wherein Z is N, P or S, and
- n is 2, 3, 4, 5, 6, 7, 8, 9, 10, 11, or 12.

The polymeric HSA may be a polymer or co-polymer of a compound of Formula (III):

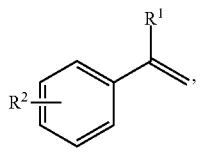

wherein
- $R^1$ is H or methyl, and
- $R^2$ is $CH_2Z^+R^3R^4R^5X^-$ or $Z^+R^3R^4R^5X^-$,
- wherein $R^3$, $R^4$ and $R^5$ are independently selected from branched or unbranched $C_1$ to $C_{12}$ alkyl, or $R^3$ and $R^4$ are joined to form a 5, or 6-membered ring together with Z and $R^5$ is branched or unbranched $C_1$ to $C_{12}$ alkyl, and
- wherein $X^-$ is $Cl^-$, $I^-$, $Br^-$, $F^-$, $SCN^-$, $OCN^-$, $OH^-$, $C_2O_4^{2-}$, $HCOO^-$, $HCO_3^-$, $CO_3^{2-}$, $OCl^-$, $OBr^-$, $BrO_3^-$, $ClO_3^-$, $SO_3^{2-}$, $NO_{2-}$, $IO^-$, $H_2PO_4^-$, $HPO_4^{2-}$, $SO_4^-$, $NO_3^-$, $ClO_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof, or
- $R^5$ and $X^-$ are absent, and
- wherein Z is N, P or S.

Where the polymeric HSA is a polymer or co-polymer of a compound of Formula (I), Formula (II), or Formula (III), Z may be N.

The polymeric HSA may be a polymer or co-polymer of a compound of Formula (IV):

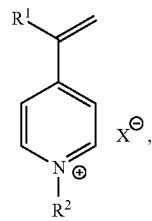

wherein
- $R^1$ is H or methyl,
- $R^2$ is optionally substituted branched or unbranched $C_1$ to $C_{18}$ alkyl,
- wherein each optional substituent is independently selected from the group consisting of vinyl, allyl, branched and unbranched $C_1$ to $C_{18}$ alkyl, Cl, Br, I, F, $-OR_5$, $-NR^5R^6$, $-N^+R^5R^6R^7$, $-SR_5$, $-COOR_5$, and carbonyl,
- wherein $R^5$, $R^6$ and $R^7$ are each independently selected from branched or unbranched $C_1$ to $C_{18}$ alkyl or H, and any two of $R^5$, $R^6$ and $R^7$ are optionally joined to form a 4, 5, or 6-membered ring together with N, and
- $X^-$ is $Cl^-$, $I^-$, $Br^-$, $F^-$, $SCN^-$, $OCN^-$, $OH^-$, $C_2O_4^{2-}$, $HCOO^-$, $HCO_3^-$, $CO_3^{2-}$, $OCl^-$, $OBr^-$, $BrO_3^-$, $ClO_3^-$, $SO_3^{2-}$, $NO_{2-}$, $IO_3^-$, $H_2PO_4^-$, $HPO_4^{2-}$, $SO_4^-$, $NO_3^-$, $ClO_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof.

In this case, $R^1$ may be H, and $R^2$ may be optionally substituted branched or unbranched $C_1$ to $C_5$ alkyl. $R^2$ may be substituted with —OH.

The polymeric HSA may be a polymer or co-polymer of a compound selected from the group consisting of diallyldimethyl ammonium halide (DADMAC), triallymethyl ammonium halide (TAMA), triallyl (2-hydroxyethyl) ammonium halide (TAHEA), diallyl ethyl (2-hydroxy ethyl) ammonium halide (DAEHEA), 1-(2-hydroxyethyl)-4-vinyl pyridinium halide (HEVP), 1-ethyl-4-vinyl pyridinium halide (EVP), vinylalkylpyrrolidinium halide (VAP), vinylpyrrolidone, allylalkylpyrrolidionium halide, diallylpyrrolidinium halide, N,N-dimethylaminoethyl methacrylate, N,N-diethylaminoethyl methacrylate, [2-(methacryloyloxy)ethyl]trimethylammonium halide, [2-(methacryloyloxy)ethyl]triethylammonium halide, N,N-dimethylaminoethyl acrylate, N,N-diethylaminoethyl acrylate, [2-(acryloyloxy)ethyl]trimethylammonium halide, [2-(acryloyloxy)ethyl]triethylammonium halide, dimethylamino alpha-methylstyrene and isomers and methyl halide quaternary salts thereof, diethylamino alpha-methylstyrene and isomers and ethyl halide quaternary salts thereof, (vinylbenzyl)trimethylammonium halide, (vinylbenzyl)triethylammonium halide, (vinylbenzyl)dimethylamine, (vinylbenzyl)diethylamine, tetraallyl ammonium halide (TAA), and tetraallyl piperazinium halide (TAP). The polymeric HSA may be a polymer or co-polymer of a compound selected from the group consisting of diallyldimethyl ammonium halide (DADMAC), trialkylmethyl ammonium halide (TAMA), triallyl (2-hydroxyethyl) ammonium halide (TAHEA), diallyl ethyl (2-hydroxy ethyl) ammonium halide (DAEHEA), 1-(2-hydroxyethyl)-4-vinyl pyridinium halide (HEVP), and 1-ethyl-4-vinyl pyridinium halide (EVP). The polymeric HSA may be a polymer or co-polymer of diallyldimethyl ammonium halide (DADMAC).

The polymeric HSA may be a co-polymer or graft polymer of at least two different compounds of Formula (I), Formula (II), Formula (III), and/or Formula (IV). The polymeric HSA may be a co-polymer of diallyldimethyl ammonium halide (DADMAC) and triallymethyl ammonium halide (TAMA).

The polymeric HSA may comprise a functional co-monomer. The functional co-monomer may be selected from the group consisting of 2-hydroxyethyl acrylate (HEA), acrylamide, and glycidyl methacrylate (GMA).

The polymeric HSA may also comprise a cross-linker. The cross-linker may be selected from the group consisting of bisacrylamide, ethylene glycol dimethylacrylate, tetraallyl piperazinium halide salts, tetraallyl ammonium halide salts, tetraallylethylenediamine and quaternized halide salts thereof, 1,3-bis(diallylamino) propane and quaternized halide salts thereof, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth) acrylate, glycerol allyloxy di(meth)acrylate, (hydroxymethyl)ethane di(meth)acrylate, 1,1,1-tris (hydroxymethyl)ethane tri(meth)acrylate, 1,1,1-tris (hydroxymethyl) propane di(meth)acrylate, 1,1,1-tris (hydroxymethyl) propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, oleyl maleate, glyceryl propoxy triacrylate, allyl methacrylate, methacrylic anhydride and methylenebis(meth)acrylamide.

In the battery of the first or second aspect of the invention, the oxidant crossover may be reduced by up to 70% over 5 hours compared to an equivalent battery without a polymeric HSA, as measured by discharge of the battery.

The halide may be selected from the group consisting of $F^-$, $Cl^-$, $Br^-$ and $I^-$. The halide may be $Br^-$. The metal cation may be selected from the group consisting of $Zn^{2+}$, $Mg^{2+}$, $Li^+$, $K^+$, $Ca^{2+}$, $Fe^{3+}$, $Fe^{2+}$, $Ni^{3+}$, and $Al^{3+}$. The metal cation may be $Zn^{2+}$.

The polymeric HSA may be not soluble in the electrolyte. Alternatively, the polymeric HSA may be soluble in the electrolyte.

DEFINITIONS

Figure 1:
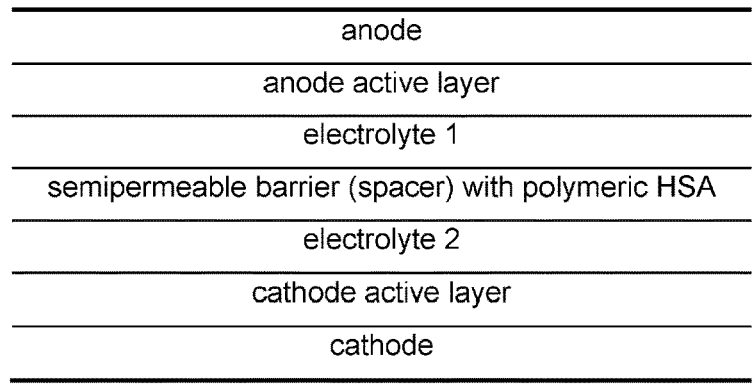
FIG. 1. Possible battery configurations incorporating polymeric HSA.
Figure 1:
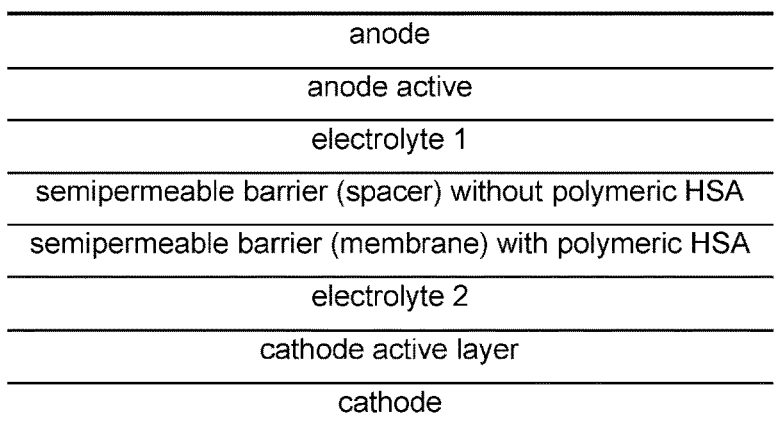
Figure 1:
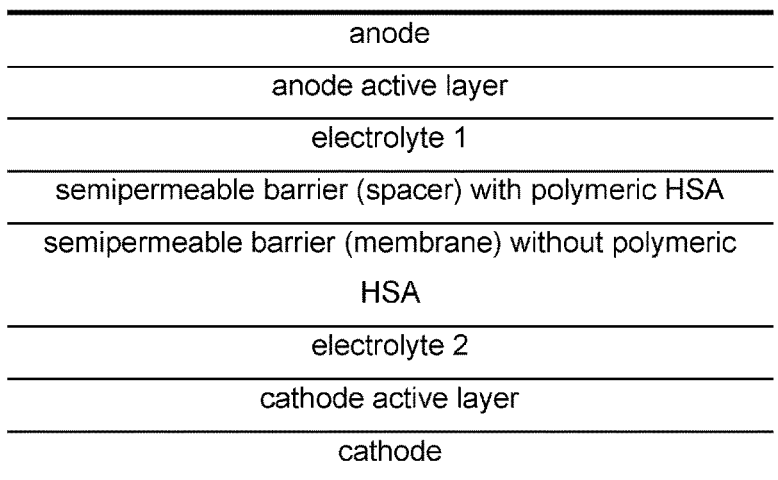
Figure 1:
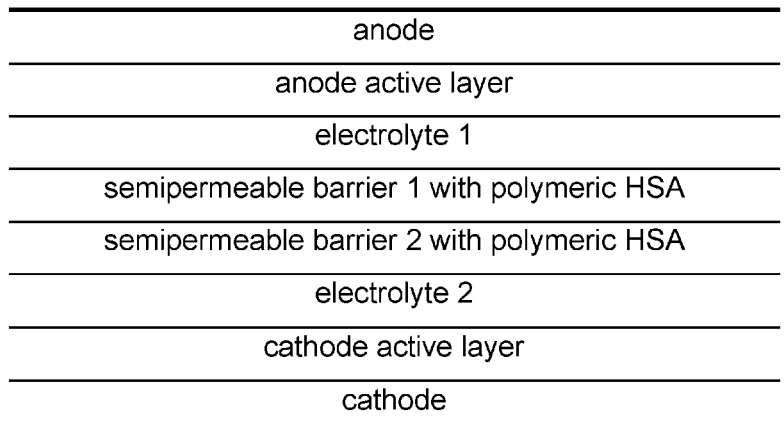
Figure 1:
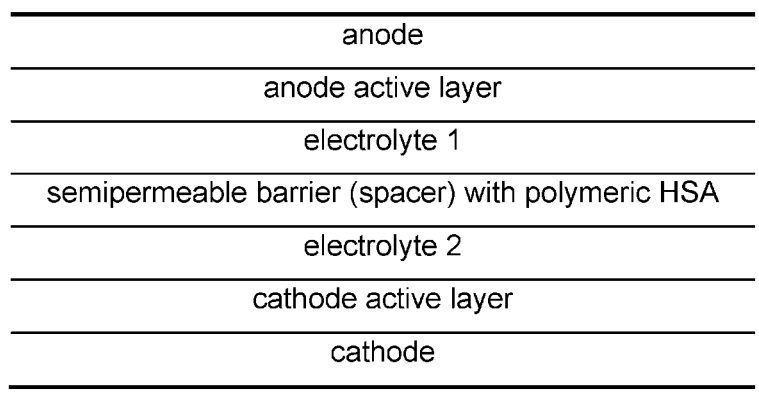
Figure 1:
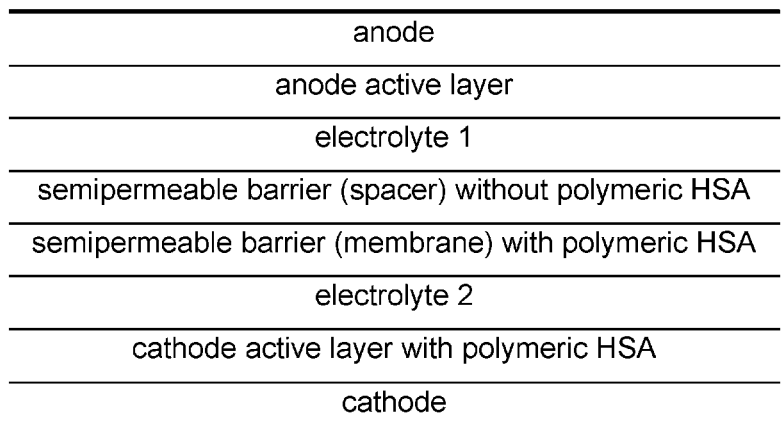
Figure 1:
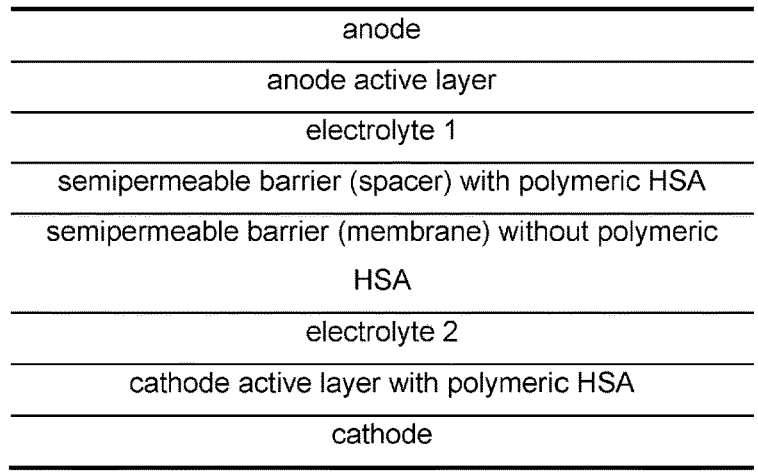
Figure 1:
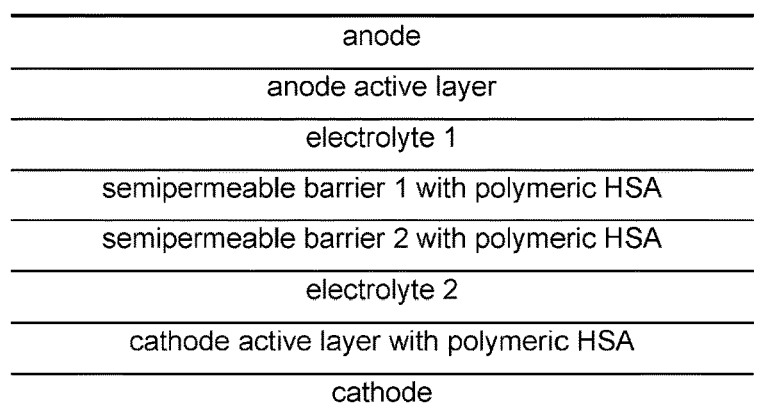
Figure 1:
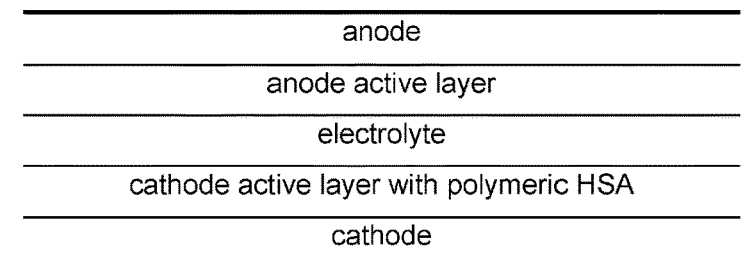
Figure 1:
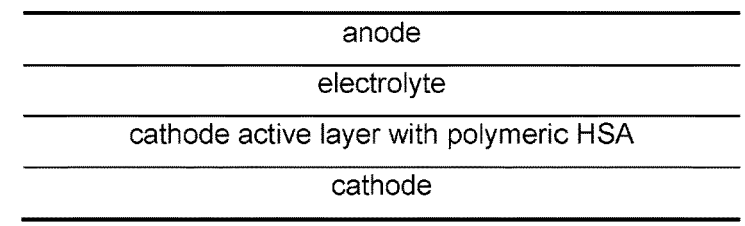
Figure 2:
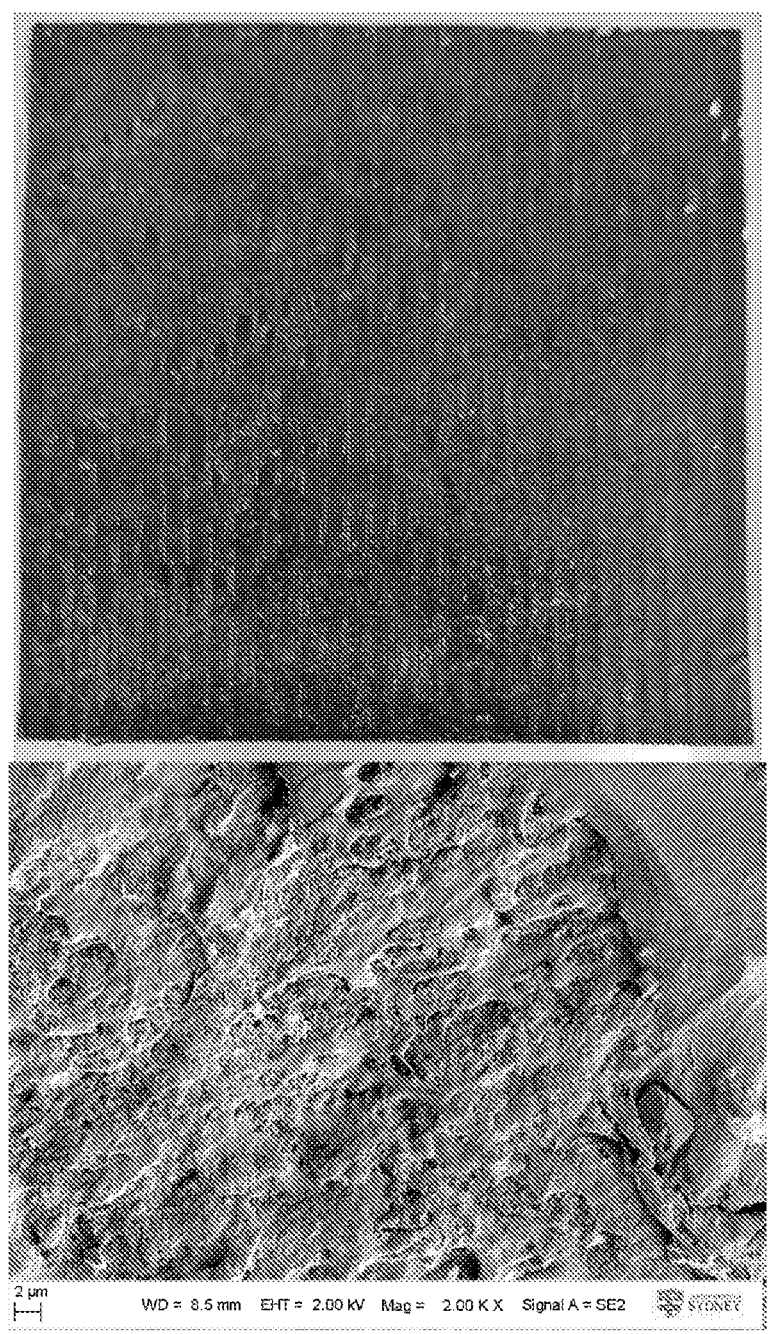
FIG. 2. DN477009-2: Polymer modified PVC membrane (Example 2e)
Figure 3:
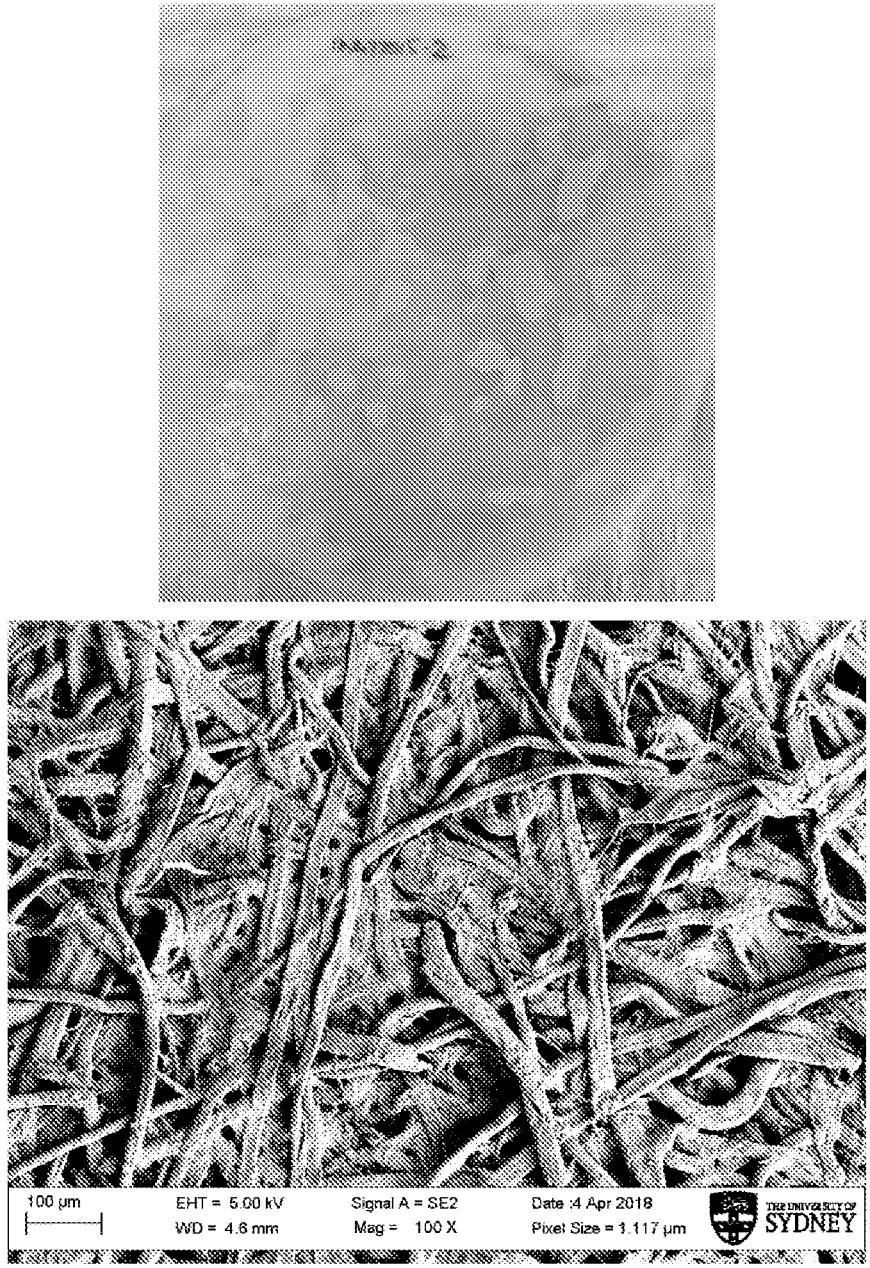
FIG. 3. DN477015-2: Polymer modified filter paper (Example 4b)
Figure 4:
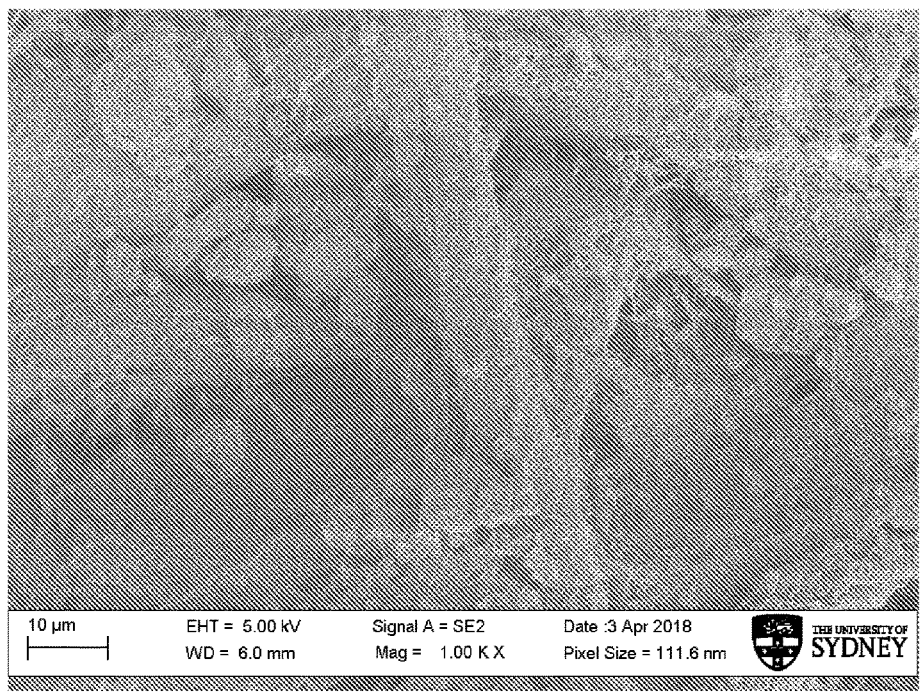
FIG. 4. DN477013-1: halloysite clay treated Whatman 2 filter paper (Example 5a)
Figure 5:
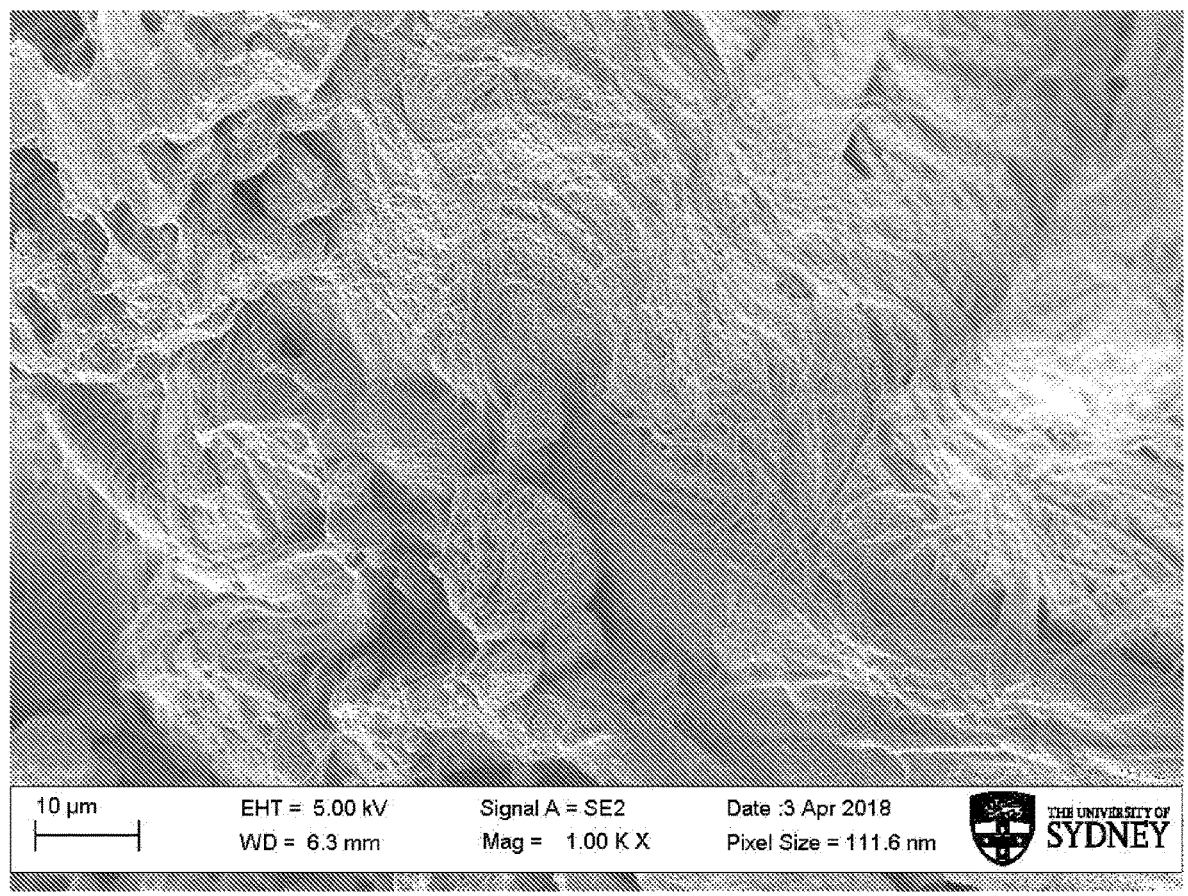
FIG. 5. DN477014-1: Poly(DADMAC)/halloysite clay modified Whatman 2 filter paper (Example 6a)
Figure 6:
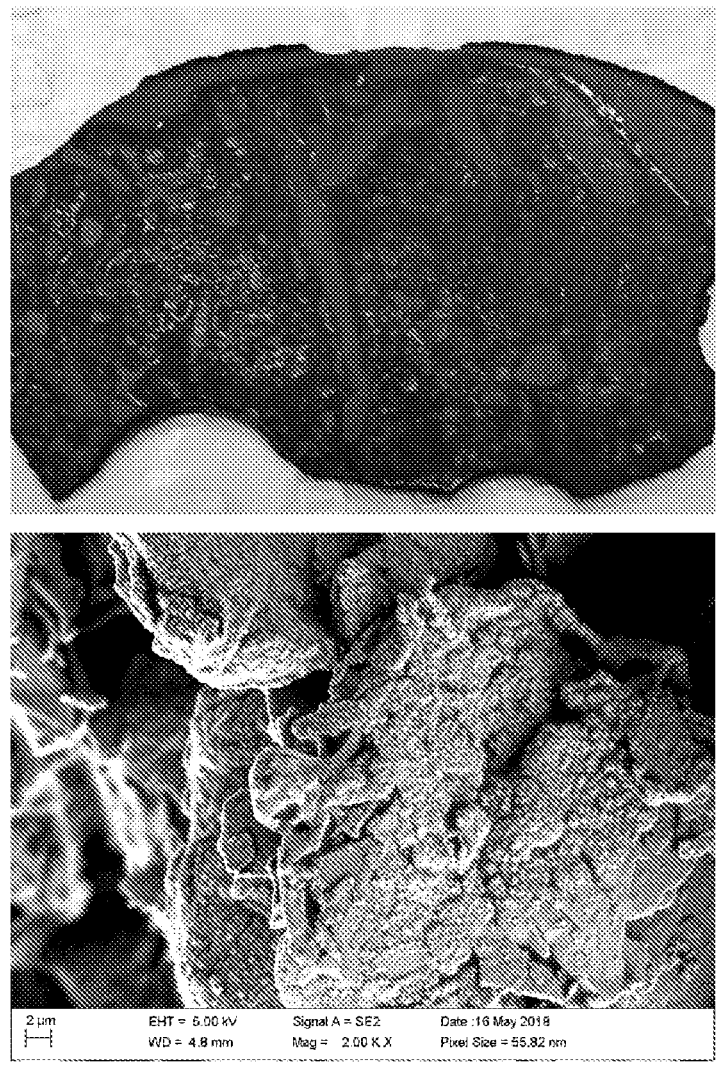
FIG. 6. DN477016-2: Polymer modified carbon cake (Example 7c)
Figure 7:
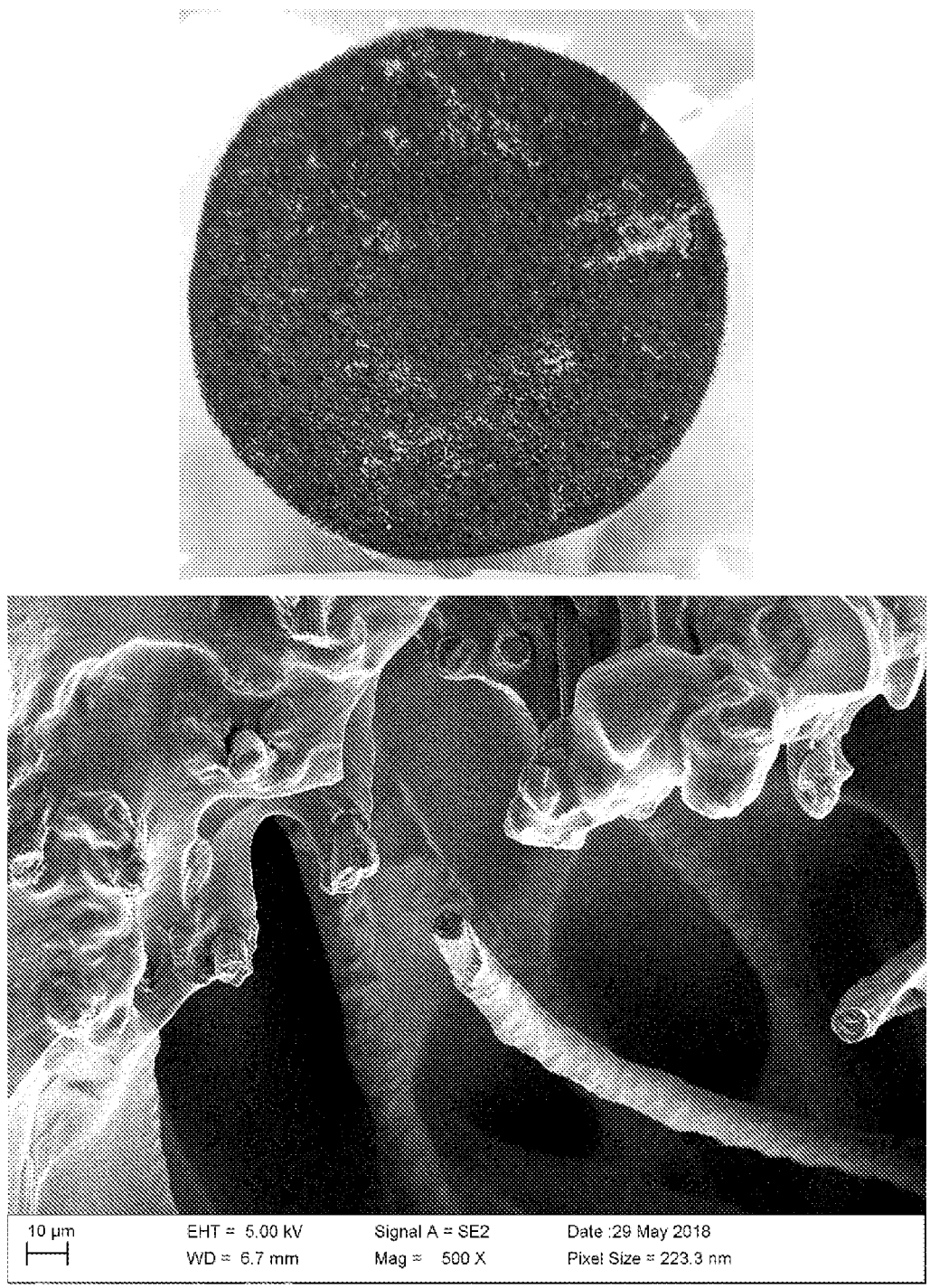
FIG. 7. DN477020-2: Polymer modified carbon felt (Example 8b)
Figure 8:
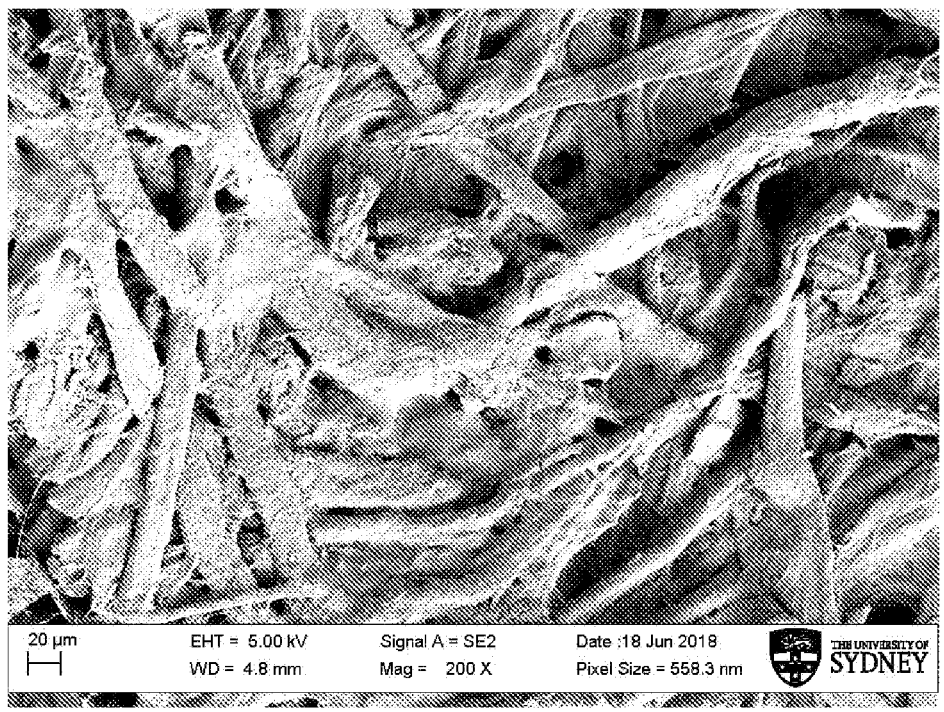
FIG. 8. Polymer modified Whatman 2 filter paper in accordance with Example 10.
Figure 9:
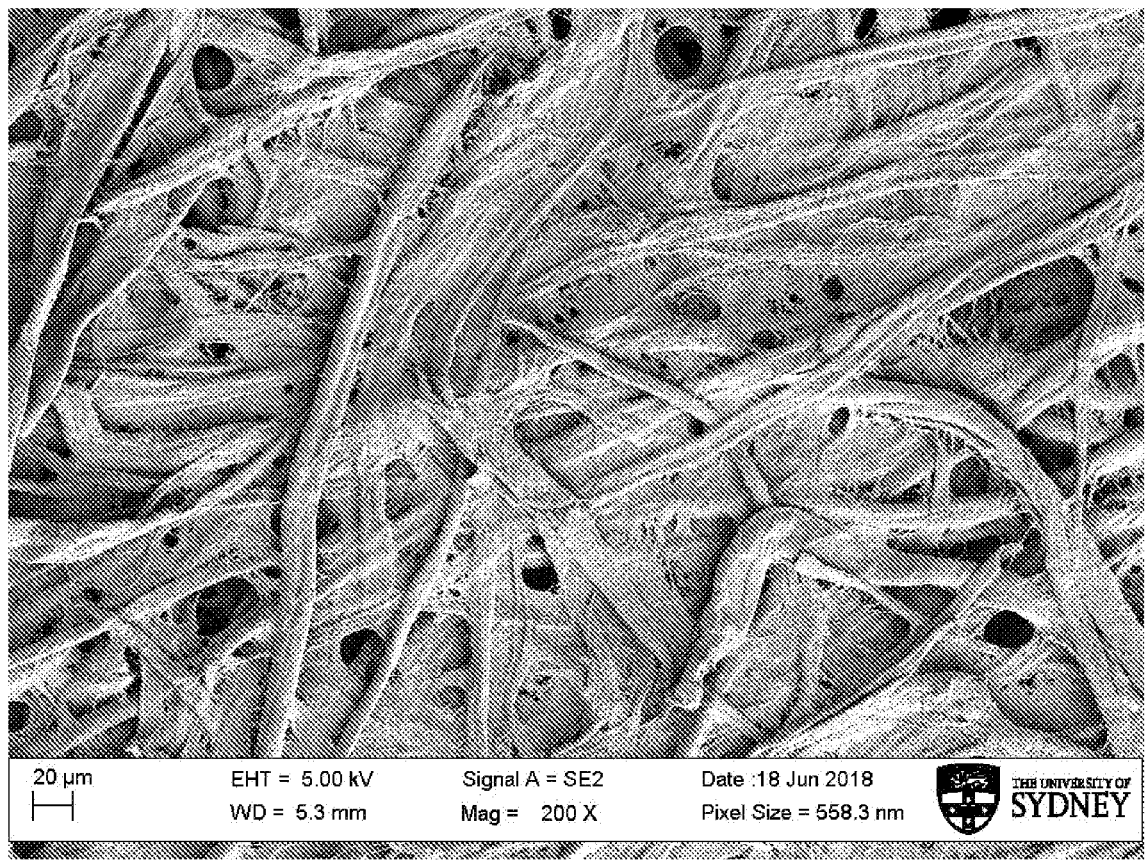
FIG. 9: Whatman 6 filter paper before modification.
Figure 10:
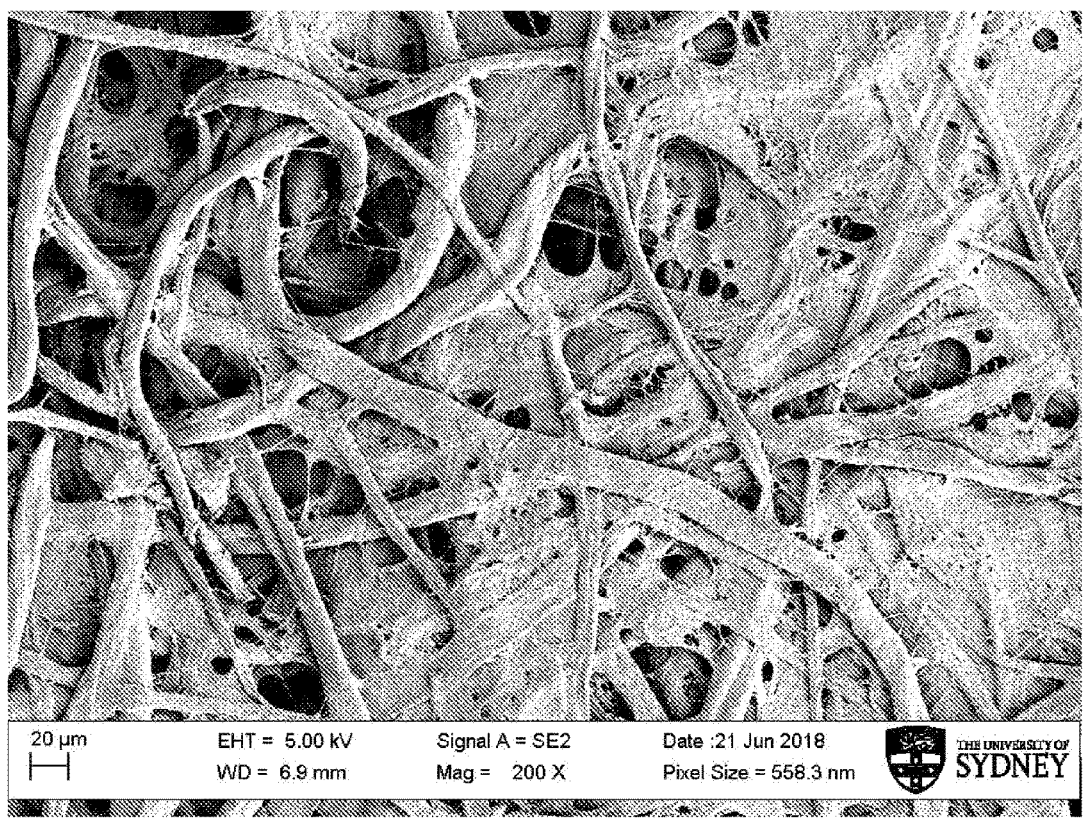
FIG. 10. Whatman 6 filter paper after polymer modification in accordance with Example 11.
Figure 11:
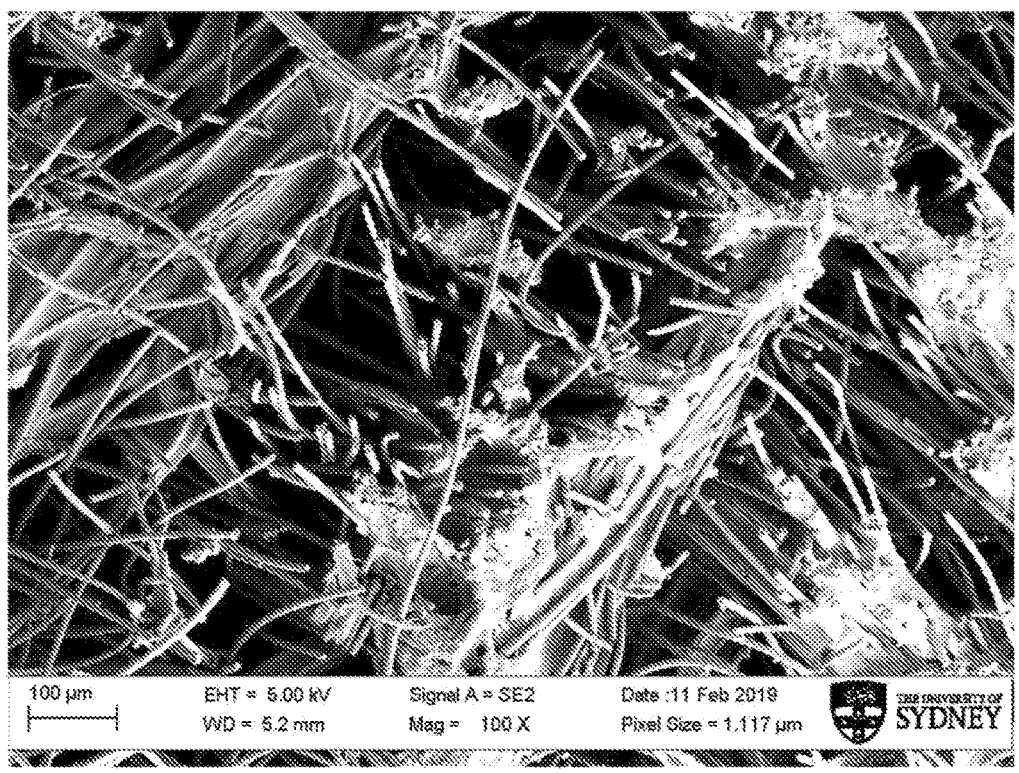
FIG. 11. DN477054-2: Carbon felt coated with poly(1-(2-hydroxyethyl)-4-vinyl pyridium bromide)) (Example 13b).
Figure 12:
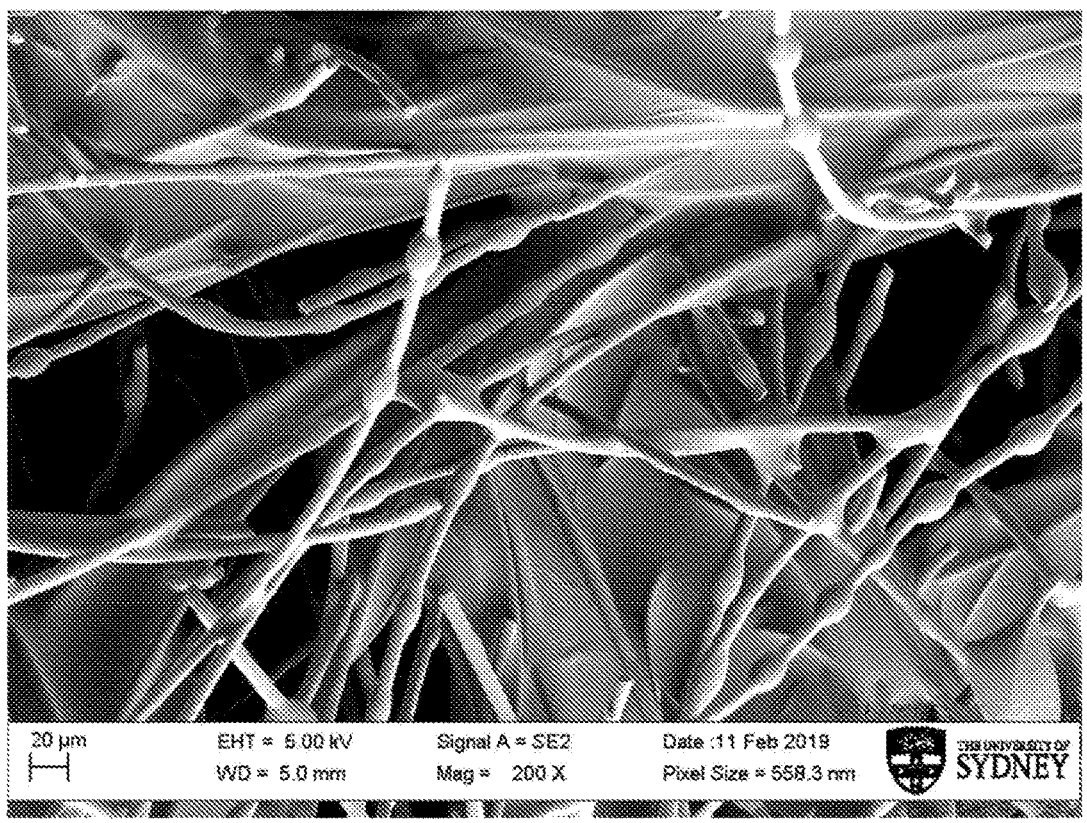
FIG. 12. DN477056-1: Coated with TAHEA-Br (Example 14b).
Figure 13:
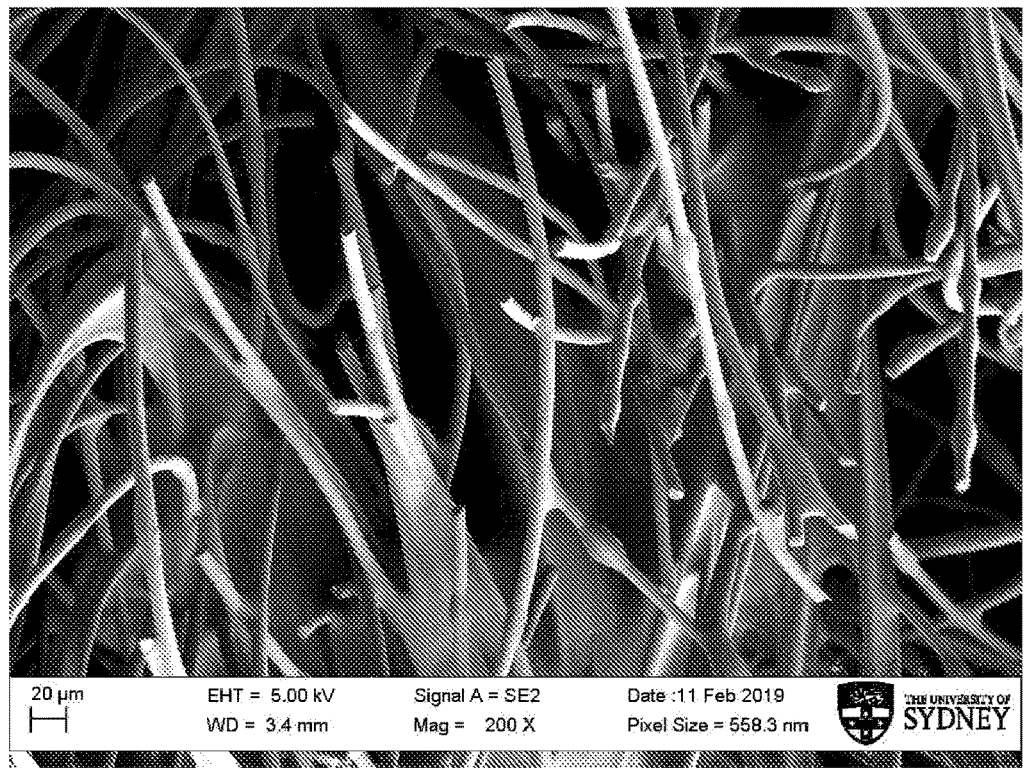
FIG. 13. DN477056-2: Carbon felt coated with TAHEA-Br crosslinked with TetraAA-Br (Example 14d).
Figure 14:
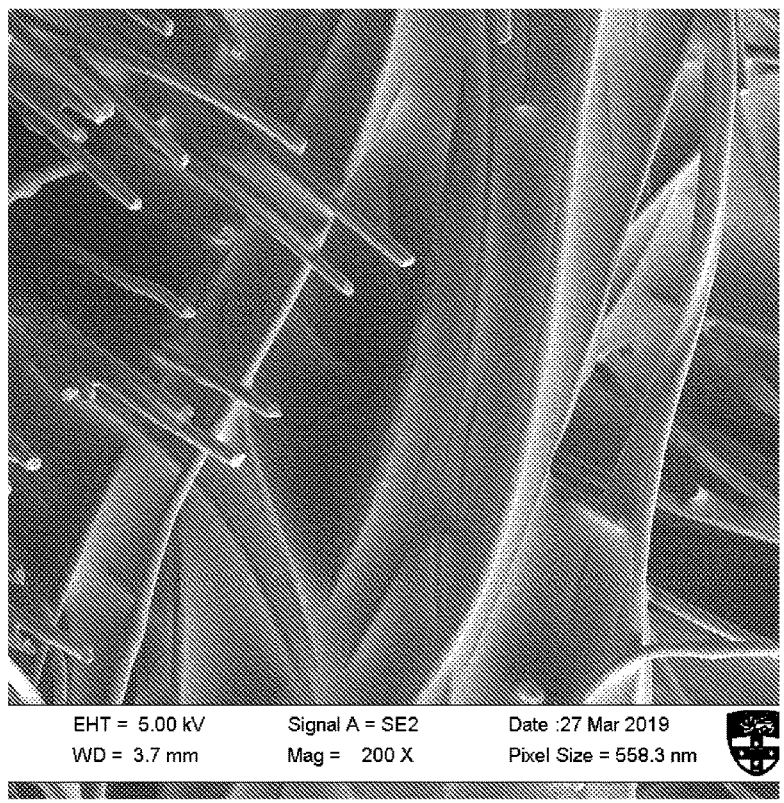
FIG. 14. DN477057-1A: Carbon felt coated with poly (DAHEA-Br) in situ (Example 15c).
Figure 15:
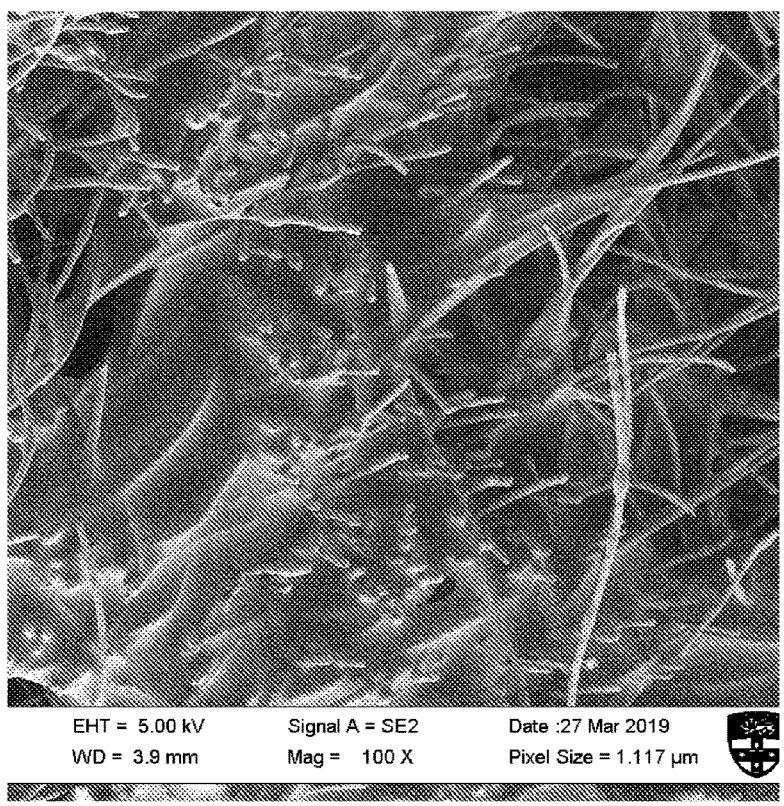
FIG. 15. DN477057-2A: Carbon felt coated with poly (DAHEA-Br) (Example 15d).
Figure 16:
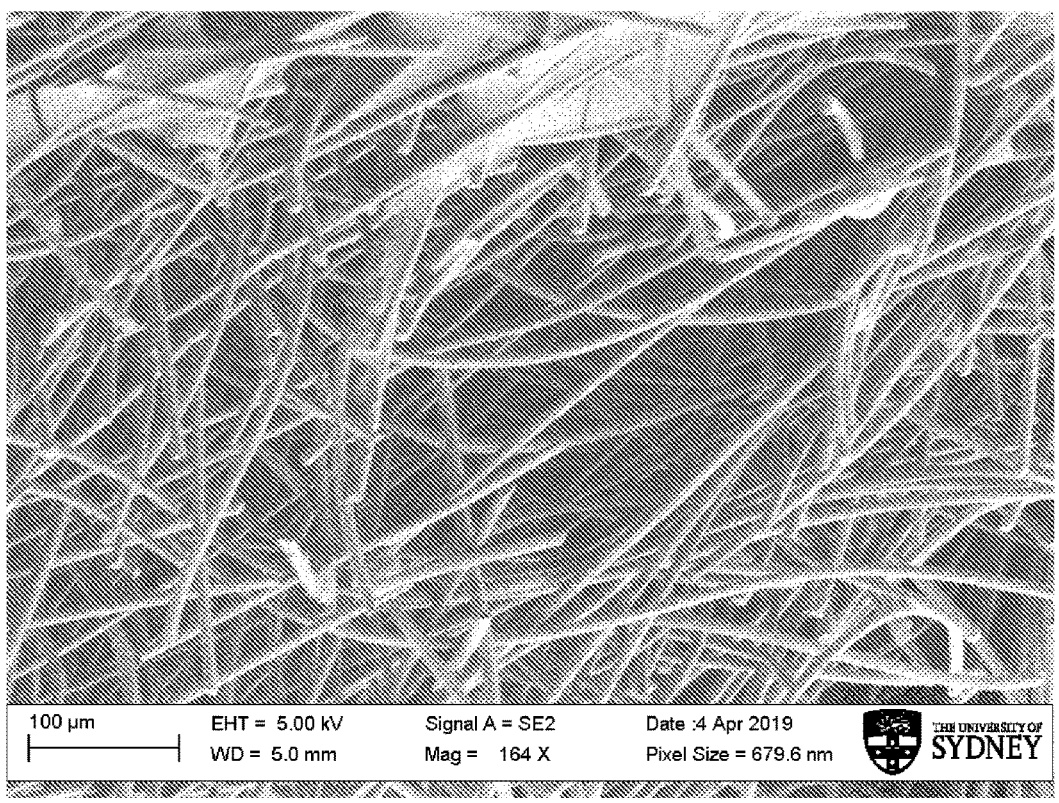
FIG. 16. DN477058-1A: Carbon felt coated with mixture of vinylethylpyridinium bromide/poly(vinylethylpyridinium bromide) (25% solution) (Example 16b).
Figure 17:
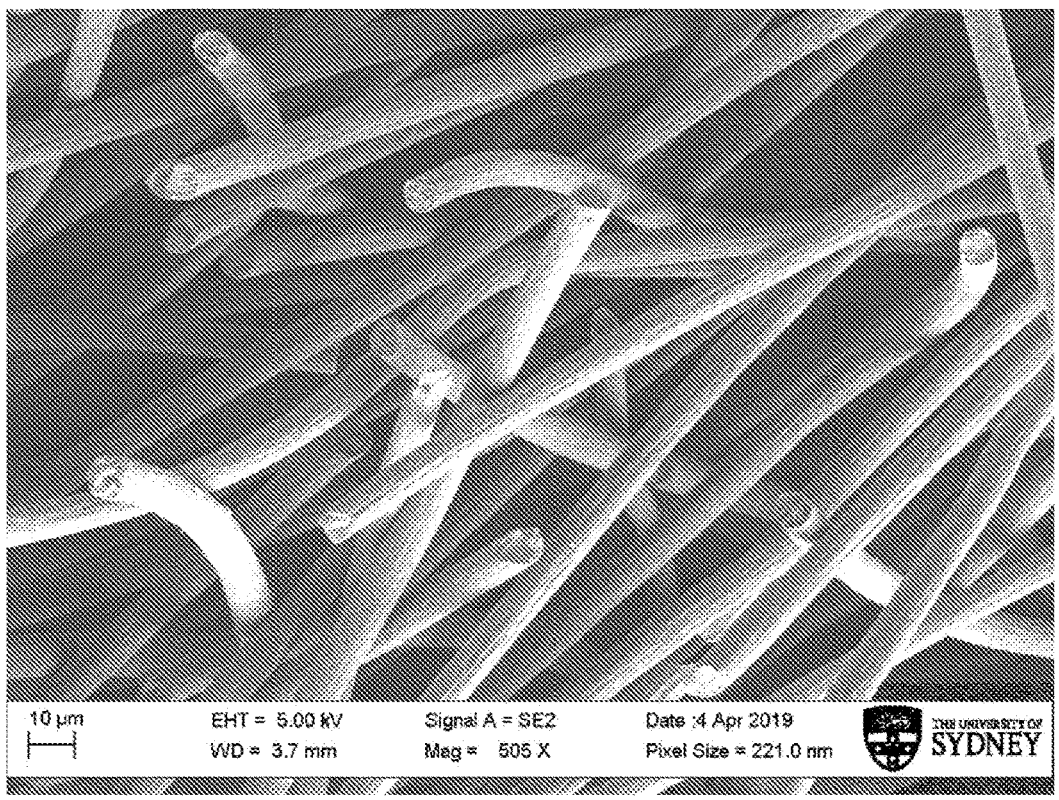
FIG. 17. DN477058-2A: Carbon felt coated with vinylethylpyridinium bromide/poly(vinylethylpyridinium bromide) (12.5% solution) (Example 16c).

As used in this application, the singular form "a", "an" and "the" include plural references unless the context clearly dictates otherwise.

As used herein, the term "comprising" means "including." Variations of the word "comprising", such as "comprise" and "comprises," have correspondingly varied meanings.

It will be understood that use the term "about" herein in reference to a recited numerical value includes the recited numerical value and numerical values within plus or minus ten percent of the recited value.

It will be understood that use of the term "between" herein when referring to a range of numerical values encompasses the numerical values at each endpoint of the range. For example, a temperature of between 80° C. and 150° C. is inclusive of a temperature of 80° C. and a temperature 150° C.

A "semipermeable barrier" refers to a material which is typically electrically non-conductive and is situated between the anode and the cathode of an electrochemical cell. The semipermeable barrier allows electrolyte ions to move between the anode and the cathode sides of the battery to balance charge, but reduces the diffusion of the oxidant and reductant between the two sides of the battery. Other roles of the "semipermeable barrier" may also include providing a controlled space between the anode and cathode to ensure an evenly distributed electro-chemical potential, and to provide a physical barrier to dendrites and other uneven deposits of the oxidant and/or reductant species.

The "oxidant" refers to the element which is reduced during discharge of the battery. The "reductant" refers to the element which is oxidised during the discharge of the battery. This terminology may be applied to each element regardless of whether the battery is charging or discharging.

Accordingly, during charging the "oxidant" is oxidised and the "reductant" is reduced. For example, in a metal-halogen battery, the halogen species may be referred to as the oxidant and the metal species may be referred to as the reductant.

The "anode" refers to the electrode at which the reductant is oxidised during discharge of the battery. The "cathode" refers to the electrode at which the oxidant is reduced during discharge of the battery. This terminology may be applied to each electrode regardless of whether the battery is charging or discharging. Accordingly, during charging, the oxidant is oxidised at the cathode and the reductant is reduced at the anode. For example, the halogen is reduced and oxidised at the cathode, and the metal is oxidised and reduced at the anode.

Any description of prior art documents herein, or statements herein derived from or based on those documents, is not an admission that the documents or derived statements are part of the common general knowledge of the relevant art.

For the purposes of description, all documents referred to herein are hereby incorporated by reference in their entirety unless otherwise stated.

DESCRIPTION OF EMBODIMENTS

The present specification relates to means of confining halogens around the cathode of a battery, where the battery is of a type that generates electrical energy by the oxidation of a metal and the reduction of a halogen (henceforth a halogen battery). The battery may be a flow battery, or a non-flow battery. During battery discharge, the reductant, which often comprises elemental metal, is oxidised at the anode to produce metal cations. At the cathode, the halogen species, typically a molecular halogen, is reduced to halide ions.

For example, the oxidation reaction of a divalent metal at the anode during battery discharge may be represented by the forward direction of Equation 1:

$$M_{(s)} \rightleftharpoons M^{2+} + 2e^- \quad \text{Equation 1}$$

The reduction reaction at the cathode during battery discharge may be represented by the forward direction of Equation 2:

$$X_2 + 2e^- \rightleftharpoons 2R^- \quad \text{Equation 2}$$

During charging of the battery, an electrical current is applied such that the reverse of Equations 1 and 2 take place.

In order to prevent self-discharge, the halogen should be prevented from diffusing from the cathode side of the battery to the anode side, where it may come into contact with the metal. Surprisingly, the inventors have found that polymers comprising moieties that sequester halogens may be incorporated into a halogen battery and result in superior battery performance compared to existing means for halogen management and confinement (such as microporous battery membranes and molecular sequestering agents). Said superior performance may include the following advantages:
  Improvement of cathode performance due to uniform halide distribution on the cathode electrode surface.
  Improvement of zinc plating quality and suppression of zinc dendrites.
  Reduction in the rate of halide crossover and decrease in self-discharge.
  Improvement in energy efficiency due to decreased halogen transport.

The battery of the invention comprises an anode and a cathode. The anode is the electrode at which the oxidation reaction takes place during discharge. The cathode is the electrode at which the reduction reaction takes place during discharge. An electrode is an electrical conductor used to make contact with a non-metallic part of a circuit. The anode and cathode may comprise any suitable material, typically an inert conductor. Suitable anode materials include carbon-filled polymers, carbon fibre felts, metals (including zinc), alloys, conductive organic polymers, conductive metallo-organic polymers, and carbon powders (optionally held by a bonder). The anode may be a combination or composite of one or more of these materials. Suitable cathode materials include inert metals such as platinum, carbon fibre felts, halogen resistant metals, conductive oxides, carbon-filled polymers, and carbon powders (optionally held by a binder). The cathode may be a combination or composite of one or more of these materials. The anode and the cathode may each further comprise a collector which is typically a conductive plate or mesh which is connected to the wires of an external circuit.

The battery comprises an oxidant and reductant, which, in the operation of the battery, react with one another to generate electrical energy. This is known as discharge. The "oxidant" refers to the element which is reduced during discharge of the battery. The "reductant" refers to the element which is oxidised during the discharge of the battery. In the battery of the invention, the oxidant is a halogen, that is, one of fluorine, chlorine, bromine or iodine. Specifically, the oxidant is molecular halogen (i.e. $F_2$, $Cl_2$, $Br_2$ or $I_2$). The reductant is a metal, which may be selected from the group consisting of Zn, Mg, Ca, K, Na, Al, Fe, and Ni. Specifically, the reductant is an elemental metal (e.g. elemental Zn Mg, Ca, K, Na, Al, Fe, or Ni). The halogen is in contact with the cathode, where it is reduced during discharge and the metal is in contact with the anode, where it is oxidised during discharge.

The discharged battery of the invention comprises a halide that is derived from the halogen. That is, during the discharge of the battery the molecular halogen (i.e. $F_2$, $Cl_2$, $Br_2$ or $I_2$) is reduced to the corresponding halide (i.e. $F^-$, $Cl^-$, $Br^-$ or $I^-$). For example, $Br_2$ is reduced to $Br^-$ during discharge of the battery, thus the $Br^-$ is derived from $Br_2$. The halogen from which the halide is derived may also be referred to as the halogen of the halide. The discharged battery of the invention also comprises a cation derived from the metal. That is, during discharge of the battery the elemental metal (e.g. elemental Zn Mg, Ca, K, Na, Al, Fe, or Ni) is reduced to the corresponding metal cation (e.g. $Zn^{2+}$, $Mg^{2+}$, $Ca^{2+}$, $K^+$, $Na^+$, $Al^{3+}$, $Fe^{2+}$, or $Ni^{3+}$). For example, Zn metal is oxidised to $Zn^{2+}$ during discharge of the battery, thus the $Zn^{2+}$ is derived from Zn metal.

Thus, the battery of the invention has a charged state wherein the oxidant is a halogen species which is a molecular halogen e.g. $Cl_2$, $Br_2$, $I_2$, etc. and the reductant is a metal species which is a metal. In the charged state, when the anode and cathode are connected in an electrical circuit, electrical energy is generated by the reduction of the oxidant and the oxidation of the reductant. The battery of the invention also has a discharged state wherein the oxidant is a halogen species which is a halide anion e.g. $Cl^-$, $Br^-$, $I^-$, etc. (the reduced state of the halogen), and the reductant is a metal species which is a metal cation, e.g. $Zn^{2+}$, $Mg^{2+}$, etc. (the oxidised state of the metal). Preferable combinations of oxidant and reductant which may be used with the battery of the invention are zinc and bromine, magnesium and bromine, or sodium and chlorine.

The battery of the invention comprises an electrolyte disposed between the anode and the cathode. The electrolyte may be a solution or may be a gel. The electrolyte contains dissolved ions which provide ionic neutrality for the charges formed at the cathode and anode during charging and discharging. For example, the dissolved ions may be lithium ions and perchlorate ions, or potassium ions and chloride ions. The electrolyte may contain water. The electrolyte may contain no water, or substantially no water, for example less than about 5% water. The electrolyte may contain a polar organic solvent such as acetonitrile. The electrolyte may be a gelated ionic liquid film, such as those described in the publication WO 2015/117189, incorporated herein by cross-reference.

It is necessary to confine the halogen to the cathode side of the battery to prevent it contacting the metal, reacting in an uncontrolled fashion, and self-discharging. This is achieved by placing the halogen in contact with a polymeric halogen sequestering agent (HSA). The polymeric HSA is a polymer which comprises a moiety capable of sequestering the halogen. A preferred moiety capable of sequestering the halogen is a quaternary ammonium halide group. Other examples include phosphonium and sulfonium groups. It is thought that the halogen complexes to the quaternary ammonium halide group by the formation of a polyhalide salt, for example as follows:

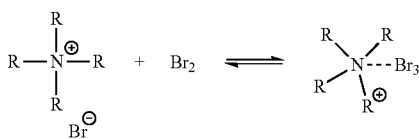

Without wishing to be bound by theory, it is thought that the halogen preferentially complexes to the polymeric HSA rather than diffusing towards the anode. As the polymeric HSA may be a solid, and insoluble in the electrolyte, it is possible to further control the localisation of the halogen in the battery (as opposed to a molecular HSA which is dissolved in the electrolyte and may settle to the bottom of the battery due to its density).

The diffusion of halogen from the cathode side of the battery to the anode side is referred to as halogen crossover. Halogen crossover may be measured qualitatively, by visually assessing the colour of the anode electrolyte and assigning the solution a value ranging from 1 (lightest colour, lowest amount of crossover) to 5 (darkest colour, highest amount of crossover). Halogen crossover may also be measured quantitatively by UV-Vis spectroscopy. Halogen crossover may also be assessed by monitoring the discharge of a cell over time, as in the Examples below. The oxidant crossover in the battery may be reduced by up to 70% over 5 hours compared to an equivalent battery without a polymeric HSA, as measured by UV-Vis spectroscopy. The oxidant crossover may be reduced by at least about 10%, or about 20, 30, 40, 50, 60, 70, 75, 80, 85, 90, 95 or 100% over 1, 2 3, 4, 5, 6, 7, 8, 9 or 10 hours compared to an equivalent battery without a polymeric HSA, as measured by UV-Vis spectroscopy.

The polymeric HSA may be a polymer of a compound of Formula (I):

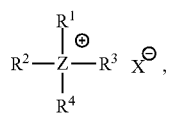

wherein

Z is N, P, or S, $R^1$ is allyl or vinyl, $R^2$ is selected from the group consisting of allyl, vinyl, and optionally substituted branched or unbranched $C_1$ to $C_{18}$ alkyl, and $X^-$ is $Cl^-$, $I^-$, $Br^-$, $F^-$, $SCN^-$, $OCN^-$, $OH^-$, $C_2O_4^{2-}$, $HCOO^-$, $HCO_3^-$, $CO_3^{2-}$, $OCl^-$, $OBr^-$, $BrO_3^-$, $ClO_3^-$, $SO_3^{2-}$, $NO_2-$, $IO^-$, $H_2PO_4-$, $HPO_4^{2-}$, $SO_4^-$, $NO_3^-$, $ClO_4^-$, bis(trifluoromethylsulfonyl)imide, bis(fluorosulfonyl)imide, hexafluorophosphate, tetrafluoroborate, tris(pentafluoro)trifluorophosphate, acetate, propionate, pentanoate, hexanoate, or a combination thereof, or $R^2$ and $X^-$ are absent, and $R_3$ and $R_4$ are each independently selected from allyl, vinyl, optionally substituted branched or unbranched $C_1$ to $C_{18}$ alkyl, or $R_3$ and $R_4$ are joined to form a 4, 5, or 6-membered ring together with Z, optionally comprising one or more heteroatoms selected from the group consisting of O, P and N, wherein said ring is optionally substituted, wherein each optional substituent is independently selected from the group consisting of vinyl, allyl, branched and unbranched $C_1$ to $C_{18}$ alkyl, Cl, Br, I, F, —$OR_5$, —$NR^5R^6$, —$N^+R^5R^6R^7$, —$SR_5$, —$COOR_5$, and carbonyl, wherein $R^5$, $R^6$ and $R^7$ are each independently selected from branched or unbranched $C_1$ to $C_{18}$ alkyl or H, and any two of $R^5$, $R^6$ and $R^7$ are optionally joined to form a 4, 5, or 6-membered ring together with N.

The polymeric HSA may be a polymer or co-polymer of a compound of Formula (II):

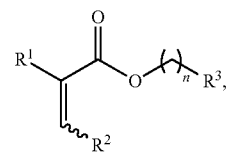

wherein $R^1$ is H or methyl, $R^2$ is H or $CH_2Z^+R^4R^5R^6X^-$, wherein when $R^2$ is H, $R^3$ is $CH_2Z^+R^4R^5R^6X^-$, and when $R^2$ is $CH_2Z^+R^4R^5R^6X^-$, $R^3$ is branched or unbranched $C_1$ to $C_{12}$ alkyl, and wherein $R^4$, $R^5$ and $R^6$ are independently selected from branched or unbranched $C_1$ to $C_{12}$ alkyl, or $R^4$ and $R^5$ are joined to form a 5, or 6-membered ring together with Z and $R^6$ is branched or unbranched $C_1$ to $C_{12}$ alkyl, and wherein $X^-$ is $Cl^-$, $I^-$, $Br^-$, $F^-$, $SCN^-$, $OCN^-$, $OH^-$, $C_2O_4^{2-}$, $HCOO^-$, $HCO_3-$, $CO_3^{2-}$, $OCl^-$, $OBr^-$, $BrO_3^-$, $ClO_3^-$, $SO_3^{2-}$, $NO_2^-$, $IO_3^-$, $H_2PO_4^-$, $HPO_4^{2-}$, $SO_4^-$, $NO_3^-$, $ClO_4^-$, bis(trifluoromethylsulfonyl)imide, bis(fluorosulfonyl)imide, hexafluorophosphate, tetrafluoroborate, tris(pentafluoro)trifluorophosphate, acetate, propionate, pentanoate, hexanoate, or a combination thereof, or $R^6$ and $X^-$ are absent, wherein Z is N, P or S, and n is 2, 3, 4, 5, 6, 7, 8, 9, 10, 11, or 12.

The polymeric HSA may be a polymer or co-polymer of a compound of Formula (III):

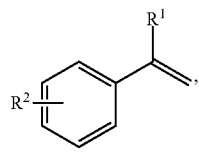

wherein
R¹ is H or methyl, and
R² is CH₂Z⁺R³R⁴R⁵X⁻ or Z⁺R³R⁴R⁵X⁻,
  wherein R³, R⁴ and R⁵ are independently selected from branched or unbranched $C_1$ to $C_{12}$ alkyl, or R³ and R⁴ are joined to form a 5, or 6-membered ring together with Z and R⁵ is branched or unbranched $C_1$ to $C_{12}$ alkyl, and
  wherein X⁻ is Cl⁻, I⁻, Br⁻, F⁻, SCN⁻, OCN⁻, OH⁻, $C_2O_4^{2-}$, HCOO⁻, $HCO_3^-$, $CO_3^{2-}$, OCl⁻, OBr⁻, $BrO_3^-$, $ClO_3^-$, $SO_3^{2-}$, $NO_2^-$, IO⁻, $H_2PO_4^-$, $HPO_4^{2-}$, $SO_4^-$, $NO_3^-$, $ClO_4^-$, bis(trifluoromethylsulfonyl)imide, bis(fluorosulfonyl)imide, hexafluorophosphate, tetrafluoroborate, tris(pentafluoro)trifluorophosphate, acetate, propionate, pentanoate, hexanoate, or a combination thereof, or
R⁵ and X⁻ are absent, and
wherein Z is N, P or S.

The polymeric HSA may be a polymer or co-polymer of a compound of Formula (IV):

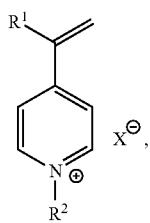

wherein
R¹ is H or methyl,
R² is optionally substituted branched or unbranched $C_1$ to $C_{18}$ alkyl,
  wherein each optional substituent is independently selected from the group consisting of vinyl, allyl, branched and unbranched $C_1$ to $C_{18}$ alkyl, Cl, Br, I, F, —OR₅, —NR⁵R⁶, —N⁺R⁵R⁶R⁷, —SR₅, —COOR₅, and carbonyl,
  wherein R⁵, R⁶ and R⁷ are each independently selected from branched or unbranched $C_1$ to $C_{18}$ alkyl or H, and any two of R⁵, R⁶ and R⁷ are optionally joined to form a 4, 5, or 6-membered ring together with N, and
X⁻ is Cl⁻, I⁻, Br⁻, F⁻, SCN⁻, OCN⁻, OH⁻, $C_2O_4^{2-}$, HCOO⁻, $HCO_3^-$, $CO_3^{2-}$, OCl⁻, OBr⁻, $BrO_3^-$, $CO_3^-$, $SO_3^{2-}$, $NO^{2-}$, $IO_3^-$, $H_2PO_4^-$, $HPO_4^{2-}$, $SO_4^-$, $NO_3^-$, $ClO_4^-$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof.

In some embodiments the polymeric HSA may be a polymer or co-polymer of a compound of Formula (IV), wherein R¹ is H, R² is optionally substituted branched or unbranched $C_1$ to $C_5$ alkyl, and X⁻ is Cl⁻, I⁻, or Br⁻. R² may be optionally substituted with —OH.

The polymeric HSA may be a polymer or copolymer of a compound of Formula (I), Formula (II), Formula (III), or Formula (IV). That is, a repeating unit in the polymer is derived from a monomer of Formula (I), Formula (II), Formula (III), or Formula (IV). The polymeric HSA may be formed by the polymerisation of a monomer of Formula (I), Formula (II), Formula (III), or Formula (IV). Alternatively, the polymeric HSA may be formed by the polymerisation of a monomer of a different structure to Formula (I), Formula (II), Formula (III), or Formula (IV), and then reacted with other chemical compounds to provide a repeating unit derived from a monomer of Formula (I), Formula (II), Formula (III), or Formula (IV). For example, the polymeric HSA may be formed by the polymerisation of (vinylbenzyl) triethylammonium halide, or alternatively, the polymeric HSA may equally be formed by the polymerization of 1-(chloromethyl)-4-vinylbenzene, followed by reaction with triethylamine (see also Example 1). In both cases, the polymeric HSA is a polymer of a compound of Formula (III).

The polymeric HSA may be a polymer or copolymer of the monomers depicted in Table 1. The polymeric HSA may be a polymer or co-polymer of a compound selected from the group consisting of diallyldimethyl ammonium halide (DADMAC), triallymethyl ammonium halide (TAMA), triallyl (2-hydroxyethyl) ammonium halide (TAHEA), diallyl ethyl (2-hydroxy ethyl) ammonium halide (DAEHEA), 1-(2-hydroxyethyl)-4-vinyl pyridinium halide (HEVP), and 1-ethyl-4-vinyl pyridinium halide (EVP). The polymeric HSA may be a polymer or co-polymer of diallyldimethyl ammonium halide (DADMAC).

TABLE 1

Exemplary monomers for polymeric HSA. R is branched or unbranched $C_1$ to $C_{12}$ alkyl and X is halogen.
Note the abbreviation 'DADMAC' is used for diallyldimethyl ammonium halide for convenience, regardless of the anion.

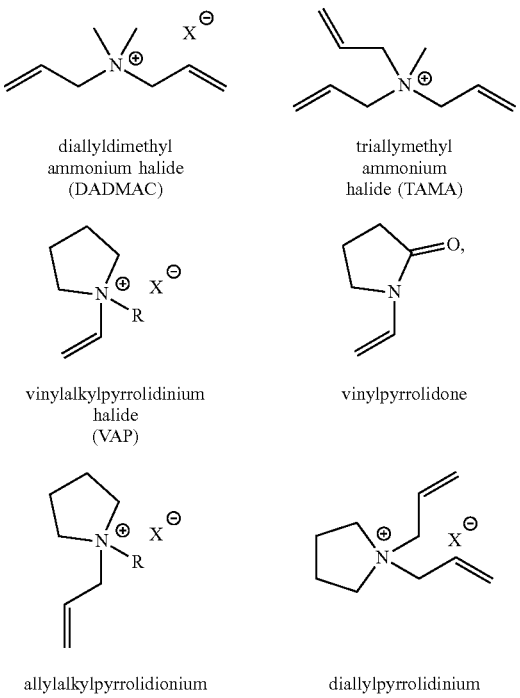

TABLE 1-continued

Exemplary monomers for polymeric HSA. R is branched or unbranched $C_1$ to $C_{12}$ alkyl and X is halogen. Note the abbreviation 'DADMAC' is used for diallyldimethyl ammonium halide for convenience, regardless of the anion.

| N,N-dimethylaminoethyl methacrylate | N,N-diethylaminoethyl methacrylate |
|---|---|
| [2-(methacryloyloxy)ethyl] trimethylammonium halide | [2-(methacryloyloxy)ethyl] triethylammonium halide |
| N,N-dimethylaminoethyl acrylate | N,N-diethylaminoethyl acrylate |
| [2-(acryloyloxy)ethyl] trimethylammonium halide | [2-(acryloyloxy)ethyl]triethyl ammonium halide |
| dimethylamino alpha-methylstyrene and isomers thereof | methyl halide quaternary salt of dimethylamino alpha-methylstyrene |
| diethylamino alpha-methylstyrene and isomers thereof | ethyl halide quaternary salt of diethylamino alpha-methylstyrene |
| (vinylbenzyl) trimethylammonium halide | (vinylbenzyl) triethylammonium halide |
| (vinylbenzyl)dimethyl amine | (vinylbenzyl)diethylamine |
| tetraallyl ammonium halide (TAA) | tetraallyl piperazinium halide (TAP) |
| triallyl (2-hydroxyethyl) ammonium halide (TAHEA) | diallyl ethyl (2-hydroxy ethyl) ammonium halide (DAEHEA) |
| 1-ethyl-4-vinyl pyridiniuum halide (EVP) | 1-(2-hydroxyethyl)-4-vinyl pyridinium halide (HEVP) |

The polymeric HSA may be a copolymer of two or more compounds of Formula (I), Formula (II), Formula (III), and/or Formula (IV). For example it may be a co-polymer of DADMAC and TAMA. The polymeric HSA may also be a graft polymer. The polymeric HSA may further comprise other monomers, for example, functional co-monomers including 2-hydroxyethyl acrylate (HEA), acrylamide, and/or glycidyl methacrylate (GMA). It is advantageous that the polymeric HSA should include monomers with functionality that is designed to anchor the HSA to the semipermeable barrier. Some functional monomers such as acrylamide are hydrophilic and may serve to reduce charge density and act as a reactive wetting agent to membrane fibres, which increases the polymer's affinity to the membrane structures. Other functional monomers such as GMA may chemically bind with the amine groups on aminated PVC membranes, producing stronger grafted polymers. Another example is 2-hydroxyethyl acrylate which may be used to anchor the polymer to a cellulose barrier. The functional co-monomer may be selected from hydroxy containing monomers including 2-hydroxyethyl methacrylate, hydroxypropyl methacrylate and isomers thereof, hydroxybutyl methacrylate and isomers thereof, 2-hydroxyethyl acrylate, hydroxypropyl acrylate and isomers thereof, hydroxybutyl acrylate and isomers thereof, N,N-dimethylaminoethyl acrylate, 2-hydroxyethyl acrylate (HEA), acrylamide, methacrylamide, N-methylacrylamide, N,N-dimethylacrylamide, N-tert-butylmethacrylamide, N—N-butylmethacrylamide, —N-methylolmethacrylamide, —N-ethylolmethacrylamide, N-tert-butylacrylamide, N—N-butylacrylamide, N-methylolacrylamide, N-ethylolacrylamide, methyl methacrylate, ethyl methacrylate, propyl methacrylate and isomers thereof, butyl methacrylate and isomers thereof, 2-ethylhexyl methacrylate, isobornyl methacrylate, methacrylic acid, benzyl methacrylate, phenyl methacrylate, methacrylonitrile, alpha-methylstyrene, methyl acrylate, ethyl acrylate, propyl acrylate and isomers thereof, butyl acrylate and isomers thereof, 2-ethylhexyl acrylate, isobornyl acrylate, acrylic acid, benzyl acrylate, phenyl acrylate, acrylonitrile, styrene, glycidyl methacrylate (GMA), glycidyl acrylate, bis(phenol a-glycidyl methacrylate), bis(phenol a-glycidyl acrylate. The polymeric HSA may also be a co-polymer of one or more compounds of Formula (I), Formula (II), Formula (III), and/or Formula (IV) and one or more non-functional monomers, such as alkenes.

The polymeric HSA may also comprise a cross-linker selected from the group consisting of bisacrylamide, ethylene glycol dimethylacrylate, tetraallyl piperazinium halide salts, tetraallyl ammonium halide salts, tetraallylethylenediamine and quaternized halide salts thereof, 1,3-bis(diallylamino) propane and quaternized halide salts thereof, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tri(meth)acrylate, pentaerythritol tetra(meth)acrylate, glycerol di(meth)acrylate, glycerol allyloxy di(meth)acrylate, (hydroxymethyl)ethane di(meth)acrylate, 1,1,1-tris (hydroxymethyl) ethane tri(meth)acrylate, 1,1,1-tris (hydroxymethyl)propane di(meth)acrylate, 1,1,1-tris (hydroxymethyl)propane tri(meth)acrylate, triallyl cyanurate, triallyl isocyanurate, triallyl trimellitate, diallyl phthalate, diallyl terephthalate, divinyl benzene, methylol (meth)acrylamide, triallylamine, oleyl maleate, glyceryl propoxy triacrylate, allyl methacrylate, methacrylic anhydride and methylenebis(meth)acryl-amide. The polymeric HSA may be prepared without a cross-linker. The inclusion of cross-linker may be preferred if the polymeric HSA would be otherwise soluble in the electrolyte.

The polymeric HSA may be insoluble in the electrolyte. For example, the mass of electrolyte required to dissolve 1 g of polymeric HSA may be greater than about 100 g, or greater than about 500, 1000, 5000, or 10,000 g. Alternatively, the polymeric HSA may be soluble in the electrolyte.

The polymeric HSA may be prepared by in situ polymerisation of one or more compounds of Formula (I) Formula (II), Formula (III), and/or Formula (IV). Alternatively, the polymeric HSA may be prepared separately and disposed onto or distributed throughout the semipermeable barrier, or comprised in a cathode active layer. In this case, a typical average MW of the polymeric HSA may be about 50,000 to about 500,000, or about 200,000 to about 350,000. However, if the polymeric HSA is cross-linked, it is understood that there is no maximum MW value.

The polymeric HSA may be deployed in various battery configurations. It may be used in a battery having a aqueous electrolyte or a battery having a non-aqueous electrolyte. In either case, the electrolyte may be a solution or it may be a gel. In some embodiments, the battery of the invention comprises a semipermeable barrier disposed between the anode and the cathode. Generally speaking, the semipermeable barrier allows electrolyte ions to move between the anode and the cathode sides of the battery to balance the charge, but reduces the diffusion of the oxidant and reductant between the two sides of the battery. The semipermeable barrier may be a membrane, which typically has a thickness of about 4 to 1000 microns. The semipermeable barrier may also be a spacer (also known as a separator), which provides a controlled gap between the anode and cathode and typically has a thickness of about 100 to 2000 microns. A semipermeable membrane which is a spacer performs the additional function of balancing the electrochemical potential over the cell area and/or physically hindering metal dendrites (which may form during charging) from penetrating into the cathode side of the battery.

The polymeric HSA may be disposed on a semipermeable barrier, which is disposed between the cathode and the anode. It is thought that such a barrier reduces halogen crossover because as the halogen diffuses through the barrier, it becomes complexed to the polymeric HSA rather than passing through the barrier to the anode side of the battery. The polymeric HSA may be located on a cathode-facing surface of the semipermeable barrier, or an anode-facing surface of the semipermeable barrier, or on both faces of the semipermeable barrier. Alternatively, the polymeric HSA may be distributed throughout the semipermeable barrier.

The polymeric HSA may be applied to the semipermeable barrier by any suitable method. One preferred method is casting, whereby the semipermeable barrier is soaked in a solution of the polymeric HSA, and the solvent subsequently evaporated. Other suitable methods include spraying, screen printing, extrusion processes, slot-die coating, dip coating, spin coating and gas-phase deposition. Another preferred method is in situ polymerisation of a compound, for example a compound of Formula (I), Formula (II), Formula (III), and/or Formula (IV) on the semipermeable barrier. In this method, a solution is prepared comprising the desired monomer or monomers, optionally a cross-linker, and a radical initiator such as 2,2'-azobis(2-methylpropionamidine) dihydrochloride. Any suitable initiator may be used for example diazo compounds such as 2,2'-azobis(isobutyronitrile) and 2,2'-azobis(2-cyanobutane), peroxides such as t-butyl peroxyacetate and t-butyl peroxybenzoate, or photochemical initiators such as benzoin derivatives and benzophenone.

The semi-permeable barrier is dipped in this solution, sealed in a substantially oxygen free container, and heated to the initiation temperature of the initiator. After the polymeric HSA is disposed on or distributed throughout the semi-permeable barrier, the semi-permeable barrier may be subject to ion exchange, for example by soaking in a solution of the desired halide counter-ion. The aim of these methods is to create a controlled and distributed coating of the polymeric HSA across the surface of and/or throughout the semipermeable barrier The battery may comprise no more than one, i.e. exactly one, semipermeable barrier having polymeric HSA disposed thereon. This barrier may be a spacer. Suitable materials for the spacer are typically non-conductive porous and/or fibrous systems. Suitable spacer materials include cellulose-based materials, liquid crystal polymers, fiber glass, polyolefin, fibre composites, sponges, fabrics, porous ceramics, gelated liquids, polyethylene, halogenated polymers. The cellulose based material may be paper. The halogenated polymer may be poly(vinylchloride) (PVC), polytetrafluoroethylene (PTFE), or polyvinylidene fluoride (PvDF). The battery may also comprise no more than one semipermeable barrier having polymeric HSA disposed thereon, where the barrier is a membrane. Suitable materials for the spacer are typically non-conductive porous and/or fibrous systems. Suitable spacer materials include cellulose-based materials, liquid crystal polymers, fiber glass, polyolefins, fibre composites, sponges, fabrics, porous ceramics, gelated liquids, polyethylene, halogenated polymers. The cellulose based material may be paper. The halogenated polymer may be poly(vinylchloride) (PVC), polytetrafluoroethylene (PTFE), or polyvinylidene fluoride (PvDF). The use of inexpensive materials such as paper coated with polymeric HSA may provide a low-cost alternative to existing, costly, membranes.

Where the semi-permeable barrier comprises paper, it may be pre-treated with inert nanomaterials to reduce membrane pore size and increase chemical resistance, prior to being contacted with the polymeric HSA. Suitable nanomaterials include natural clays such as halloysite, synthetic clays, metal oxide, or silica particles. The pre-treatment may comprise being dipped in an aqueous dispersion of the nanomaterial, followed by drying.

The battery may comprise no more than two, i.e. exactly two, semipermeable barriers. One semipermeable barrier has polymeric HSA disposed thereon. This semipermeable barrier is typically a membrane. The second semipermeable membrane may have no polymeric HSA disposed thereon. This semipermeable barrier is typically a spacer. Alternatively, both semipermeable barriers, i.e. both the membrane and the spacer, may have polymeric HSA disposed thereon.

The battery may comprise more than two, for example, three, four, five, six, seven, eight, nine, ten, or more semipermeable barriers. One, two, three, four five, six, seven, eight, nine, ten, or more of said semipermeable barriers may have polymeric HSA disposed thereon. Alternatively, none of said semipermeable barriers may have polymeric HSA disposed thereon. In a further alternative, the battery may not contain a semipermeable barrier disposed between the cathode and the anode.

The cathode of the battery of the invention may further comprise a cathode active layer, which is the region of the battery where the cathode redox reaction takes place. The polymeric HSA may be distributed in and/or on the cathode active layer. That is, the polymeric HSA may be coated on the surface of the cathode active layer, and/or it may be distributed throughout the bulk of the cathode active layer. The cathode active layer typically comprises a high surface area carbon material. The carbon material may be a carbon felt, carbon foam, packed carbon powder, expanded graphite, aerogel carbon, xerogel carbon, or sol-gelated carbon. The high surface area carbon material may have a surface area of greater than 70 $cm^2/cm^3$, or greater than 75, 80, 85, 95, or 100 $cm^2/cm^3$. The surface area may be between 70 and 3500 $cm^2/cm^3$, or between 75 and 3500, 80 and 3500, 85 and 3500, 95 and 3500, or 100 and 3500 $cm^2/cm^3$. Expressed gravimetrically, the high surface area carbon material may have a surface area of greater than 100 $cm^2/g$, or greater than 200, 300, 400, 500, 600, 700, 800, 900, or 1000 $cm^2/g$. The surface area may be between 100 $cm^2/g$ and 3500 $m^2/g$, or between 200, 300, 400, 500, 600, 700, 800, 900, or 1000 $cm^2/g$ and 3500 $m^2/g$. The polymeric HSA may be distributed throughout the carbon material. The carbon material may porous and the HSA may coat the pores of the carbon material. The polymeric HSA may be coated on the surface of the carbon material.

In some embodiments, the cathode active layer does not comprise, or is not, vitreous carbon. In some embodiments, the cathode active layer does not comprise, or is not, reticulated vitreous carbon. Reticulated vitreous carbon has a surface area of less than 70 $cm^2/cm^3$. Vitreous carbon is a non-reactive, non-graphitising carbon. High surface area carbon materials used in the cathode active of the battery of the invention are all graphitising carbons, and have greater chemical reactivity than vitreous carbon. Graphetisation is understood to be the formation of a graphite structure in carbons at high temperature (e.g. >2000° C.).

It is thought that upon charging the battery, halide ions are oxidised to molecular halogen in the cathode active layer, and are rapidly sequestered by the polymeric HSA, thereby confining the halogen to the cathode active layer. This reduces halogen crossover, as the halogen is confined to the cathode active layer, and improves energy efficiency as the halogen is already present in the cathode active layer where it will be reduced during discharge.

In some embodiments, the cathode active layer may be, for example, a 'carbon cake' comprising carbon powder, or a carbon felt. A 'carbon cake' cathode active layer, which is a form of packed carbon powder, may be prepared by preparing a slurry of carbon powder in a solvent, pouring the slurry into a mould, and drying the slurry. The cathode active layer comprising the polymeric HSA may be prepared by preparing a solution comprising the desired monomer or monomers, optionally a cross-linker, and a radical initiator such as 2,2'-azobis(2-methylpropionamidine) dihydrochloride. The cathode active layer is dipped in this solution, sealed in a substantially oxygen free container, and heated to the initiation temperature of the initiator. After the polymerisation, the cathode active layer may be subject to ion exchange, for example by soaking in a solution of the desired halide counter-ion. Alternatively, the cathode active layer, such as a carbon felt, may be soaked in a solution of a polymer comprising a moiety capable of sequestering the halogen, then the solvent evaporated, i.e. by casting as described above. Other suitable methods include spraying, screen printing, extrusion processes, slot-die coating, dip coating, spin coating and gas-phase deposition.

Where the cathode active layer is a 'carbon cake' comprising packed carbon powder, the cathode active layer may further comprise a binder. A binder is typically a polymer, and serves to hold the packed carbon powder together as a cohesive structure. Suitable binders include fluorinated polymers, such as polytetrafluoroethylene (PTFE), polyvinylidene difluoride-co-hexafluoropropylene (PVDF-HFP), and polyvinylidene difluoride (PVDF). However, the manufacture of packed carbon electrodes comprising binders may require additional processing steps, and utilise costly organic solvents. The inventors have advantageously found that poly(DADMAC) may function as both a halogen sequestering agent, and as a binder. Further, packed carbon electrodes comprising poly(DADMAC) may be prepared using water as the solvent. Therefore in some embodiments, the cathode active layer comprises a polymeric HSA, and does not comprise an additional binder (other than the polymeric HSA).

The present invention also relates to the use of a polymeric HSA to reduce oxidant crossover in a battery, wherein the battery is a battery of the invention as described above. The invention also relates to a method of reducing oxidant crossover in a battery of the invention as described above, the method comprising placing the oxidant, which is the halogen, in contact with a polymeric HSA. It is believed that a battery of invention incorporating the polymeric HSA has reduced halogen crossover in comparison to a comparable micro-porous battery membrane without the polymeric HSA, and is significantly more cost-effective than an ion-exchange membrane. The oxidant crossover maybe reduced by up to 70% over 5 hours as measured by UV-Vis spectroscopy, as described above.

The present invention also relates to the use of a polymeric HSA in the production of a battery. A battery according to the invention may be produced by providing an anode, a cathode, and an electrolyte disposed between the anode and the cathode, and placing a metal in contact with the anode, and placing a halogen in contact with a polymeric halogen sequestering agent (HSA) which is a polymer comprising a moiety capable of sequestering the halogen. For example, a cell may be packed with a zinc metal anode, a filter paper separator, and a cathode active layer according to the invention comprising polymeric HSA, then filled with acetonitrile electrolyte saturated with zinc bromide and lithium perchlorate (serving as a supporting electrolyte). Upon charging, the metal (zinc) is electroplated onto the anode and bromide is oxidised to bromine at the cathode where it is complexed by the polymeric HSA.

Also disclosed is a method of storing electrical energy comprising providing a battery of the invention as described above, which is in its discharged state, and applying a voltage between the anode and the cathode such that the halide is oxidised and the metal cation is reduced. The battery of the invention has a charged state wherein the oxidant is a molecular halogen e.g. $Cl_2$, $Br_2$, $I_2$, etc. and the reductant is a metal, typically electroplated on the anode. In the charged state, when the anode and cathode are connected in an electrical circuit, electrical energy is generated by the reduction of the oxidant and the oxidation of the reductant. The battery of the invention also has a discharged state wherein the oxidant is a halide anion e.g. $Cl^-$, $Br^-$, $I^-$, etc. (the reduced state of the halogen), and the reductant is a metal cation, e.g. $Zn^{2+}$, $Mg^{2+}$, etc. (the oxidised state of the metal). When the battery of the invention is provided in its discharged state, a current may be applied to the anode and the cathode, which causes the oxidant to be oxidised and the reductant to be reduced, thereby storing electrical energy.

EXAMPLES

Modification of a PVC Membrane

Example 1. PVC Membrane Modification by Quaternisation with Ethylenediamine

Example 1a (DN477002). Quaternization of PVC Membranes with Ethylenediamine (EDA)

PVC membranes (40 pieces, 5 cm×5 cm, 42 g) were placed in a 500 mL glass container. A solution containing 80% EDA (250 g) was added to the container which was subsequently sealed and heated at 60° C. over 24 hours. After the quaternisation, the wet quaternised membranes (Wet Q-PVC) were washed with water (3 times) and methanol (once). They were then dried in a vacuum oven at 40° C. overnight before further modification or testings. These membranes were called Q-PVC.

Example 1b (DN477002-2). Further Quaternization of Wet Q-PVC Membranes with Iodomethane (IM)

Wet Q-PVC membranes (10 pieces) was placed in a 500 mL glass container. A THF solution containing 10% IM (100 g) were added to the container which was sealed and left to react for 2 hours. After the quaternisation, the membranes were repeatedly washed with acetone and water (3 times). After washing, they were dried in an oven at 80° C. for 3 hours to remove all the volatile organic materials. Ion exchange was carried out on the dry membranes by placing them in 0.2M sodium bromide solution for 12 hours. They were then repeatedly washed with water and methanol prior to vacuum oven drying (40° C., 12 hours). The final products were called 2Q-PVC membranes. These membranes were used for bromine transportation studies.

Example 2. Poly(DADMAC-Co-TAMA) Modification of PVC Membranes

Example 2a (DN477001). Quaternization of Triallylamine (TAA) with Iodomethane (IM)

Bromoethane (20 g) was added to a solution of TAA (20 g) and Tetrahydrofuran (THF) (100 g). After the addition, the solution remained clear, indicating no reaction. To this solution, IM (45 g) was slowly added and left under magnetic stirring over 12 h to produce a paste containing white powder. The powder was filtered, washed 3 times with THF and found to contain pure triallylmethylammonium (TAMA) iodide.

Example 2b (DN477008-1). Monomer Solution Containing Diallyldimethylammonium Chloride (DADMAC) and TAMA for Polymer Modification of PVC Membranes In a beaker, a monomer solution containing DADMAC (65%, 20.0 g) with TAMA (2.6 g), initiator 2,2'-azobis(2-methylpropionamidine) dihydrochloride (V50, 0.7 g) was prepared by mixing to produce a viscous slightly cloudy solution. This monomer solution was used for polymer modification of PVC membranes.

Example 2c (DN477008-3). Poly(DADMAC-Co-TAMA) Modification of Untreated PVC Membranes PVC membranes (5 cm×5 cm, untreated) were dipped in the monomer solution from 2b. They were then individually wrapped in aluminium foils and placed in a plastic zip bag. Excessive monomer and air were removed from the samples by applying vacuum for 30 seconds. The bag was quickly sealed and dipped in a temperature regulated oil bath at 70° C. for 1 hour to carry out the polymerization. After the reaction, foil was removed from the samples to reveal polymer modified PVC membranes. Loose polymer was removed from the membranes by washing with water. Ion exchange was then carried out by soaking in 0.1M NaBr solution (100 mL) for 2 hours. These membranes were used for bromine cross over study.

Example 2d (DN477009-1). Monomer Solution Containing DADMAC, TAMA and N,N'-methylenebis(acrylamide) (Bis-AAm) for Polymer Modification of PVC Membranes Monomer solution was prepared in the same manner as in 2b. Crosslinker, Bis-AAm, (1.4 g) and water (2.0 g) was also added.

Example 2e (DN477009-2). Poly(DADMAC-co-TAMA-Crosslinked-Bis-AAm) Modification of Untreated PVC Membranes Untreated PVC membranes were modified in the same manner as in 2c using monomer mixture from 2d.

Example 3. Poly(DADMAC-Co-TAMA-Co-HEA-Crosslinked-Bis-AAm) Modification of PVC Membranes Example 3a (DN477006-1). Monomer Solution for Polymer Modification of PVC Membranes In a beaker, a monomer solution containing DADMAC (65%, 30.0 g) with TAMA (2.0 g), hydroxyethyl acrylate (HEA, 3 g), glycidyl methacrylate (GMA, 2.0 g), Bis-AAm (2.0 g), V50 (2.0 g) and water (1.1 g) was prepared by mixing to produce a viscous slightly cloudy mixture. This monomer mixture was used for polymer modification of PVC membranes.

Example 3b (DN477006-3). Polymer Modification of Untreated PVC Membranes

PVC membranes (5 cm×5 cm, untreated) were dipped in the monomer solution from 3a. They were then individually wrapped in aluminium foil and placed in a plastic zip bag. Excessive monomer and air were removed from the samples by applying vacuum for 30 seconds. The bag was quickly sealed and dipped in a temperature regulated oil bath at 70° C. for 1 hour to carry out the polymerisation. After the reaction, foil was removed from the samples to produce polymer modified PVC membranes. Loose polymer was removed from the membranes by washing with water. Ion exchange was then carried out by soaking in 0.1M NaBr solution (100 mL) for 2 hours. The membranes were washed with methanol prior to oven drying at 50° C. for 12 hours. These membranes were used for bromine cross over study.

Example 3c (DN477007-3). Polymer Modification of Q-PVC Membranes

Q-PVC membranes from example 1a (5 cm×5 cm) was treated in the same manner as in Example 3b. They were used for bromine cross over study.

Example 4. Poly(DADMAC-Co-TAMA-Co-HEA-Crosslinked-EGDMA) Modification of Filter Papers (Whatman 2)

Example 4a (DN477015-1). Monomer Solution for Polymer Modification of Whatman 2 Filter Papers In a beaker, a monomer solution containing DADMAC (65%, 30.0 g) with TAMA (3.0 g), HEA (3 g), ethylene glycol dimethacrylate (EGDMA, 3.0 g) and V50 (1.0 g) was prepared by mixing to produce a viscous slightly cloudy mixture. This monomer mixture was used for polymer modification of Whatman 2 filter papers.

Example 4b (DN477015-2). Polymer Modification of Untreated Filter Papers

Whatman 2 filter papers (11 cm, untreated) was dipped in the monomer solution from 4a. They were then individually wrapped in aluminium foil and placed in a plastic zip bag. Excessive monomer and air were removed from the samples by applying vacuum for 30 seconds. The bag was quickly sealed and dipped in a temperature regulated oil bath at 70° C. for 1 hour to carry out the polymerisation. After the reaction, foil was removed from the samples to reveal polymer modified filter paper. These membranes were used for bromine cross over study.

Example 5. Poly(DADMAC-Co-TAMA-Co-HEA-Crosslinked-EGDMA) Modification of Halloysite Clay Treated Filter Papers (Whatman 2)

Example 5a (DN477013-1). Halloysite Clay Treated Whatman 2 Filter Papers

In a beaker, a halloysite clay dispersion containing halloysite clay (20.0 g) and water (80.0 g) was prepared by mechanical mixing at 2000 rpm for 30 minutes. Individual Whatman 2 filter papers were dipped in the clay dispersion to produce clay treated papers. Excessive water from each paper was first removed by using a Buchner funnel with applied vacuum for 1 minute. The wet papers were then dried in the oven at 50° C. over 12 hours to produce halloysite clay treated Whatman 2 filter papers. They were used for bromine cross over study.

Example 5b (DN477013-2). Polymer Modification of Halloysite Treated Whatman 2 Filter Papers Halloysite treated Whatman 2 filter papers from example 5a (11 cm) were modified by polymerisation in the same manner as in Example 4b using the monomer mixture from 4a. They were used for bromine cross over studies.

Example 6. Poly(DADMAC)/Halloysite Modification of Filter Papers (Whatman 2)

Example 6a (DN477014-1). Halloysite Clay Treated Whatman 2 Filter Papers

In a beaker, a poly(DADMAC)/halloysite clay dispersion containing halloysite clay (20.0 g) and poly(DADMAC) (Sigma-Aldrich, 20% in water, Mw 200,000-350,000 g/mol) (80.0 g) was prepared by mechanical mixing at 2000 rpm for 15 minutes. To this dispersion, 50 g water was added while under stirring for another 15 minutes to produce a viscous polymer clay dispersion. Individual Whatman 2 filter papers were dipped in the polymer/clay dispersion to produce polymer/clay treated papers. Excessive water from each paper was first removed by using a Buchner funnel with applied vacuum for 1 minute. The papers were then dried in an oven at 50° C. over 12 hours to produce poly (DADMAC)/halloysite clay treated Whatman 2 filter papers. They were used for bromine cross over study.

Cross-Linked Polymer Modified Electrodes Examples

Example 7.
Poly(DADMAC-Co-TAMA-Co-HEA-Crosslinked-EGDMA) Modification of Carbon Cake Example 7a. 'Carbon Cake' Synthesis Poly(vinylidene fluoride-co-hexafluoropropylene) binder (1.0353 g, Sigma-Aldrich, average Mw ~455,000, average Mn ~110,000, pellets) was dissolved in 1-methy-2-pyrrolidone (14.6950 g, Merke, synthesis grade) with vigour stirring in 100° C. beaker covered with foil for over two hours. Once dissolved, Ketjenblack (0.1013 g, EC300J) was added and the mixture was continued heating and stirring for half an hour. Microfyne graphite (4.42 g, Asbury Carbons) was added with vigorous stirring for 2 hours. The mixture was poured hot into a glass petri dish and was heated on a hotplate to 100° C. in a fumehood for several hours until dry, the sample was cooled and able to demould from the petri dish.

Example 7b (DN477016-1). Monomer Solution for Polymer Modification of Carbon Cake In a beaker, a monomer solution containing DADMAC (65%, 10.0 g) with TAMA (1.0 g), HEA (1.0 g), EGDMA (1.0 g), ethanol (1.0 g) and V50 (0.3 g) was prepared by mixing to produce a viscous slightly cloudy mixture. This monomer solution was used for polymer modification of carbon cake.

Example 7c (DN477016-2). Polymer Modification of Carbon Cake

Carbon cake from 7a was modified by polymerisation in the same manner as in Example 4b using the monomer mixture from 7b.

Example 8.
Poly(DADMAC-Co-TAMA-Co-HEA-Crosslinked-EGDMA) Modification of Carbon Felt Example 8a (DN477020-1). Monomer Solution for Polymer Modification of Carbon Felt In a beaker, a monomer solution containing DADMAC (65%, 60.0 g) with TAMA (6.0 g), HEA (6.0 g), EGDMA (12.0 g), ethanol (6.0) and V50 (1.6 g) was prepared by mixing to produce a viscous slightly cloudy mixture. This monomer mixture was used for polymer modification of carbon felt.

Example 8b (DN477020-2). Polymer Modification of Carbon Felts

Samples of carbon felt (5.6 cm) were plasma treated for 3 minutes in a plasma cleaner (Harrick Plasma). After the treatment, each piece was dipped in the monomer solution from 8a. Whatman 1 filter papers (5.5 cm) were placed on each side of the felt to absorb the monomer excess. They were then individually wrapped in aluminium foil and placed in a plastic zip bag. Excessive monomer and air were further removed from the samples by applying vacuum for 30 seconds. The bag was quickly sealed and dipped in a temperature regulated oil bath at 70° C. for 1 hour to carry out the polymerisation. After the reaction, foil was removed from the samples to produce polymer modified carbon felt. Ion exchange was then carried out by soaking in 0.1 M NaBr solution (100 mL) for 2 hours. These membranes were used for bromine cross over study.

Example 9. Poly(DADMAC) Modification of Carbon Cake

Example 9a. 'Carbon Cake' Synthesis

Poly(vinylidene fluoride-co-hexafluoropropylene) binder (1.0837 g, Sigma-Aldrich, average Mw ~455,000, average Mn ~110,000, pellets) was dissolved in 1-methy-2-pyrrolidone (16.26 g, Merke, synthesis grade) with vigour stirring in 100° C. beaker covered with foil for over two hours. Microfyne graphite (7.49 g, Asbury Carbons) was added with vigorous stirring for 2 hours. The mixture was poured hot into a glass petri dish and was heated on a hotplate to 100° C. in a fume-hood for several hours until dry, the sample was cooled and able to demould from the petri dish.

Example 9b Poly(DADMAC). Deposition to Carbon Cake

Poly(diallyldimethylammonium) chloride solution (6.6442 g, average Mw 200,000-350,000, 20 wt. % in $H_2O$) was dissolved in methanol (9.996 g, Merke). The mixture was poured on the cake in a petri dish and allowed to absorb the mixture, then allowed to dry in a fume hood for 2 hours at room temperature. Additional ethanol and acetone was poured on the cake after 3 hours. The sample was then dried on a hot plate set to 80° C. The cake was then put in an oven for 12 hours before use.

Example 9c Poly(DADMAC). Deposition to Carbon Felt

Poly(diallyldimethylammonium) chloride solution (1.046 g, average Mw 200,000-350,000, 20 wt. % in $H_2O$) was dissolved in methanol (7.73 g, Merke). The mixture was poured on the felt (0.5956 g) in a petri dish and allowed to absorb the mixture. The sample was then dried on a hot plate set to 80° C. The cake was then put an oven (80° C.) for 12 hours before use.

Example 10.
Poly(DADMAC-Co-TAMA-Co-HEA-Crosslinked-EGDMA) Modification of Filter Papers (Whatman 2)

Example 10a (DN477023-1). Monomer Solution for Polymer Modification of Whatman 2 Filter Papers In a beaker, a monomer solution containing DADMAC (65%, 30.0 g) with TAMA (3.0 g), HEA (3 g), ethylene glycol dimethacrylate (EGDMA, 6.0 g), water (20.0 g), ethanol (10.0 g) and V50 (1.0 g) was prepared by mixing to produce a viscous slightly cloudy mixture. This monomer mixture was used for polymer modification of Whatman 2 filter papers.

Example 10b (DN477023-2) Polymer Modification of Whatman 2 Filter Papers

Whatman 2 filter papers (11 cm, untreated) were dipped in the monomer solution from Example 10a. They were then wrapped in aluminium foil and placed in a plastic zip bag. Excessive monomer and air were removed from the samples by applying vacuum for 30 seconds. The bag was quickly sealed and dipped in a temperature regulated oil bath at 70° C. for 1 hour to carry out the polymerisation. After the reaction, foil was removed from the samples to reveal polymer modified filter paper. After washing with acetone, these membranes were used for the bromine cross over study.

Example 11. Poly(DADMAC-Co-TAMA-Co-HEA-Crosslinked-EGDMA) Modification of Filter Papers (Whatman 6)

Example 11a (DN477025-1). Monomer Solution for Polymer Modification of Whatman 6 Filter Papers In a beaker, a monomer solution containing DADMAC (65%, 30.0 g) with TAMA (3.0 g), HEA (3 g), ethylene glycol dimethacrylate (EGDMA, 6.0 g), water (20.0 g), ethanol (10.0 g) and V50 (1.0 g) was prepared by mixing to produce a viscous slightly cloudy mixture. This monomer mixture was used for polymer modification of Whatman 6 filter papers.

Example 11b (DN477025-2). Polymer Modification of Whatman 6 Filter Paper

Whatman 6 filter papers (11 cm, untreated) was dipped in the monomer solution from Example 11a. They were then wrapped in aluminium foil and placed in a plastic zip bag. Excessive monomer and air were removed from the samples by applying vacuum for 30 seconds. The bag was quickly sealed and dipped in a temperature regulated oil bath at 70° C. for 1 hour to carry out the polymerisation. After the reaction, foil was removed from the samples to reveal polymer modified filter paper. After washing with acetone, these membranes were used for the bromine cross over study.

Example 12. Poly(1-(2-hydroxyethyl)-4-Vinyl Pyridinium Bromide)) (Poly(HEVP-Br) Modification of Carbon Felt Example 12a (DN477052-1). Preparation of 1-(2-hydroxyethyl)-4-Vinyl Pyridinium Bromide) (HEVP-Br)

Bromoethanol (12 g) was added to a solution of 4-vinyl pyridine (4-VP, 12 g) and ethanol (20 g). The solution was heated at reflux at 40° C. for 2 days to produce a purple solution with viscous precipitates. Unreacted chemicals were removed by rotary evaporation at 50 millibar at 40° C., then washed with hexane to produce an oily viscous mixture. After drying under vacuum overnight, the mixture was dissolved in water in a sonic bath to produce a clear purple solution with 26% solids.

Example 12b (DN477052-La). Carbon Felt Modification with HEVP-Br

Carbon felt pieces (5.6×5.6 cm) were dipped in the solution from Example 12a. Surplus solution was removed by placing and pressing each piece between to 2 filter papers with gentle force. The samples were then dried in an oven at 50° C. for 12 hours. Dry carbon felt samples were used in further tests.

Example 12c (DN477052-2a). Carbon Felt Modification with Poly(HEVP-Br)

Ammonium persulfate (0.04 g) was added to the solution from Example 12a (5 g) in a 20 mL vial. The vial was sealed, purged with nitrogen for 5 min then heated at 70° C. for 12 h to produce a viscous yellow solution. A piece of carbon felt (5.6×5.6 cm) was dipped in this polymer solution (4 g with 0.5 g EtOH). Surplus liquid was removed by placing and pressing the carbon felt between 2 filter papers with gentle force. The polymer coated sample was then dried in an oven at 50° C. for 12 h prior to further testing.

Example 12d (DN477059-2). Carbon Felt Modification with HEVP-Br

Carbon felt pieces (5.6×5.6 cm) were dipped in a solution from Example 12a (10 g) containing EtOH (1 g). The samples were then placed in a zip bag, sealed and vacuum was applied for 30 seconds for the liquid to better coat the felts. They were then dried in an oven at 100° C. for 12 hours. Dry carbon felt samples were used in further tests.

Example 13. Poly(1-(2-hydroxyethyl)-4-vinyl pyridinium bromide)) (poly(HEVP-Br) Modification of Carbon Felt Example 13a (DN477054-1). Preparation of poly(1-(2-hydroxyethyl)-4-vinyl pyridinium bromide)) (poly(HEVP-Br))

Bromoethanol (10 g) was added to a solution of poly (4-vinyl pyridine) (Sigma, 60 kg/mole) (P4-VP, 5 g), water (20 g) and ethanol (80 g). The solution was heated at reflux at 40° C. for 2 days to produce a viscous clear solution. Unreacted chemicals and EtOH were removed by rotary evaporation at 50 millibar at 40° C. to produce a clear viscous solution with 21% solids.

Example 13b (DN477054-2). Carbon Felt Modification with Poly(HEVP-Br)

Carbon felt pieces (5.6×5.6 cm) were dipped in the solution from Example 13a. The samples were then dried in a vacuum oven at 40° C. for 24 hours. Dry carbon felt samples were used in further tests.

Example 14. Poly(triallyl (2-hydroxyethyl) ammonium bromide)) (poly(TAHEA-Br)) Modification of Carbon Felt Example 14a (DN477048-1). Preparation of triallyl (2-hydroxyethyl) ammonium bromide (TAHEA-Br)

Bromoethanol (20 g) was added to a solution of triallyl amine (15 g) and ethanol (30 g). The solution was then heated under reflux at 40° C. for 24 hours. Unreacted chemicals and ethanol were removed by rotary evaporation at 50 millibar at 40° C. to produce a brownish and viscous solution. The product was washed with hexane and then dried under vacuum prior to further use.

Example 14b (DN477056-1A). Carbon Felt Modification with Poly(TAHEA-Br)

A monomer solution was prepared by mixing TAHEA (7.5 g), water (7.5 g), ethanol (1 g) and V50 initiator (0.1 g). This solution (5 g) was applied onto a piece of carbon felt (5.6×5.6 cm). The felt was placed between two filter papers, then wrapped in Al foil. The sample was placed in a plastic zip bag, sealed, vacuumed and heated in an oil bath at 70° C. for 3 hours. After washing with acetone, the modified carbon felt was dried in vacuum oven at 100° C. before further use.

Example 14c (VH479035). Preparation of Tetraallyl Ammonium Bromide (TetraAA-Br) Crosslinker To a mixture of triallyl amine (TAA, 89 g, 0.65 mol) in ethanol (198 g), allyl bromide (111 g, 0.92 mol) was added dropwise over a period of 30 min at 20° C. to yield a clear solution. The solution was magnetically stirred at 20° C. for 24 h. The reaction mixture was subsequently concentrated under reduced pressure to give a brownish waxy solid before it was precipitated in tetrahydrofuran to give colourless crystals of TetraAA-Br. The crystals were then dried under high vacuum for 16 h at 20° C. The tetra-AA-Br crystals were found to be slightly hydroscopic and stored under anhydrous conditions.

Example 14d (DN477056-2A). Carbon Felt Modification with Poly(TAHEA-Br) Crosslinked with Tetraallyl Ammonium Bromide (TetraAA-Br)

The monomer solution from Example 14b (9 g) was mixed TetraAA-Br (0.1 g). This solution was then used to modify carbon felt as in Example 14b.

Example 15. Poly(diallyl ethyl (2-hydroxy ethyl) ammonium bromide) (poly(DAEHEA-Br) Modification of Carbon Felt Example 15a (VH479097-1). Preparation of diallyl (2-hydroxyethyl) amine (DAHEA)

Bromoethanol (90 g) was added to a solution of diallyl amine (DAA, 53 g) and water (52 g) under stirring. To this solution, 50% NaOH in ethanol (50 g) was added dropwise. The mixture was left to stir for 2 days under reflux at room temperature. After reaction, the purple top oil layer was separated from the bottom water layer using a separating funnel. The oil part was further washed with water and dichloromethane then dried with sodium sulfate. After washing, dichloromethane was removed by rotary evaporation at 700 millibar at 40° C. to produce a brown viscous liquid.

Example 15b (VH479097-3). Preparation of diallyl ethyl (2-hydroxyethyl) ammonium bromide (DAEHEA-Br)

Bromoethane (40 g) was added dropwise to a solution of DAHEA (20 g) and ethanol (20 g) under stirring. The mixture was left stirred for overnight at reflux at 50° C. After reaction, ethanol was removed by rotary evaporation at 50 millibar at 55° C. The product was precipitated in THF, and dried under vacuum to yield DAEHEA-Br brown solid.

Example 15c (DN477057-1A). Carbon Felt Modification with Poly(DAEHEA-Br)

DAEHEA-Br (7.5 g) from Example 15b was mixed with water (7.5 g), ethanol (2 g) and V50 producing a clear brown solution. This solution (5 g) was applied onto a piece of carbon felt (5.6×5.6 cm). The felt was placed between two filter papers, then wrapped in Al foil. The sample was placed in a plastic zip bag, sealed, vacuumed and heated in an oil bath at 70° C. for 3 hours. After washing with acetone, the modified carbon felt was dried in vacuum oven at 100° C. before further use.

Example 15d (DN477057-2a). Carbon Felt Modification with Poly(DAEHEA-Br) Solution The solution from Example 15d (10 g) was sparged with nitrogen then heated for 3 hours to polymerise. Carbon felt pieces (5.6×5.6 cm) were dipped in the resulting polymer solution. The samples were then dried in a vacuum oven at 40° C. for 24 hours. Dry carbon felt samples were used in further tests.

Example 16. Poly(1-ethyl-4-vinyl pyridinium bromide)) (poly(EVP-Br) Modification of Carbon Felt Example 16a (VH479103). Preparation of 1-hydroxyethyl-4-vinyl pyridinium bromide (EVP-Br)

Bromoethane (10 g) was added to a solution of 4-vinyl pyridine (4-VP, 15 g) and ethanol (10 g). The solution was heated at reflux at 40° C. for 2 days to produce a dark brown solution with viscous precipitates. The product was washed with THF and filtered yielding a brown solid. The product was dried under vacuum overnight prior to further use.

Example 16b (DN477058-La). Carbon Felt Modification with EVP-Br (25% Solution)

Solid (10 g) from Example 16a was mixed with water (26 g) and ethanol (4 g) producing a viscous brown solution. Carbon felt pieces (5.6×5.6 cm) were dipped in this solution. Surplus solution was removed by placing and pressing each piece between 2 filter papers with gentle force. The samples were then dried in an oven at 100° C. for 2 hours. Dry carbon felt samples were used in further tests.

Example 16c (DN477058-2a). Carbon Felt Modification with EVP-Br (12.5% Solution)

Solution from Example 16b (7.5 g) was diluted with water (7 g) and EtOH (0.5 g). This solution was used to treat carbon felt in the same manner as in Example 16b.

Example 16d (DN477058-3a). Carbon Felt Modification with Poly(EVP-Br)

Ammonium persulfate (0.04 g) was added to the solution from Example 16a (10 g) in a 20 mL vial. This solution (5 g) was applied onto a piece of carbon felt (5.6×5.6 cm). The felt was placed between two filter papers, then wrapped in Al foil. The sample was placed in a plastic zip bag, sealed, vacuumed and heated in an oil bath at 70° C. for 3 hours. After washing with ethanol, the modified carbon felt was dried in an oven at 100° C. before further use.

Example 16e (DN477058-4a). C Felt Modification with Poly(EVP-Br)

The leftover solution (5 g) in the vial from Example 16d was sealed, purged with nitrogen for 5 min then heated at 70° C. for 12 h to produce a viscous solution. A piece of carbon felt (5.6×5.6 cm) was dipped in the polymer solution. Surplus liquid was removed by pressing the carbon felt between 2 filter papers with gentle force. The polymer coated sample was then dried in an oven at 100° C. for 2 hours prior to further testing.

Example 17. Poly(1-(2-hydroxyethyl)-4-vinyl pyridinium bromide)) (poly(HEVP-Br)) Modification of Carbon Felt Example 17a (VH479107). Preparation of 1-(2-hydroxyethyl)-4-vinyl pyridinium bromide) (HEVP-Br)

Bromoethane (12.5 g, 0.100 mol) was added dropwise to a solution of 4-vinyl pyridine (10 g, 0.095 mol) and ethanol (11 g) with stirring. The mixture was stirred for 24 hours at reflux at 50° C. After reaction, ethanol was removed by rotary evaporation at 50 millibar at 55° C. The product was precipitated in THF, dried under vacuum to yield a brown solid.

Example 17b (DN477060-2). Carbon Felt Modification with HEVP-Br/Poly(HEVP-Br)

Powder from Example 17a (5 g) was dissolved in water (15 g) and ethanol (2 g) to produce a purple viscous solution. Carbon felt pieces (5.6×5.6 cm) were dipped in the solution, then dried in an oven at 100° C. for 12 hours before use in further tests.

Example 18 (4TE6). Polydiallyldimethylammonium Chloride (Poly(DADMAC) Modification of Carbon Felt Polydiallyldimethylammonium chloride (20.49 g, 20% w/w solution, M.W. 200-350 kDa, Sigma-Aldrich) was dissolved in methanol (24.86 g). The solution was poured on to carbon felt pieces (4.96 g). Felts were allowed to dry in air then dried in a 120° C. oven.

Example 19 (4TE9). Activated Carbon/Carbon Black Electrode with PTFE Binder

Activated carbon (12.29 g, Acticarb PS1300F), carbon black (0.69 g, Ketjenblack, EC300J) and PTFE water dispersion (2.64 g, 60% Sigma-Aldrich) was mixed with careful addition of isopropyl alcohol until the powder dispersion began to clump. The clump materials were then kneaded into ball and then rolled flat onto glass to a thickness of <1 mm. The sample was then dried at 80° C. overnight.

Example 20 (4TE11). Activated Carbon/Carbon Black/Poly(DADMAC) Electrode with PTFE Binder Activated carbon (12.03 g, Acticarb PS1300F), carbon black (0.79 g, Ketjenblack, EC300J) PTFE water dispersion (3.209 g, 60% Sigma-Aldrich), and poly(diallyldimethylammonium) chloride (14.09 g, 20% w/w solution, M.W. 200-350 kDa, Sigma-Aldrich) was mixed with careful addition of isopropyl alcohol until the powder dispersion began to clump. The clump materials were then kneaded into ball and then rolled flat on to glass to a thickness of <1 mm. The sample was then dried at 80° C. overnight.

Example 21 (4TE23). Activated Carbon/PVDF-HFP Electrode

PVDF-HFP (0.5967 g, Sigma Aldrich, 400 kDa) was first dissolved in NMP (11.3289 g) then activated carbon (4.1888 g, Acticarb PS1300F) was suspended in the solution. The solution was poured into a silicone mould and allowed to dry on a hot plate at 50° C. in a fumehood overnight, to make an electrode of thickness slightly >1 mm.

Example 22 (4TE26). Activated Carbon/PVDF-HFP/Poly(DADMAC) Electrode

Poly(diallyldimethylammonium) chloride (2.7788 g, 20% w/w solution, M.W. 200-350 kDa, Sigma-Aldrich) was mixed with methanol (3.6413 g) and poured onto a premade PVP bound electrode (2.7329 g, Example 21-4TE23). The coated electrode was allowed to dry on a hot plate at 50° C. in a fumehood overnight, to make an electrode of thickness slightly >1 mm.

Example 23 (3TF58). Activated Carbon/Poly(DADMAC) Binder

Poly(diallyldimethylammonium) chloride (4.1034 g, 20% w/w solution, M.W. 200-350 kDa, Sigma-Aldrich) was mixed with methanol (8.9307 g) then activated carbon (4.0966 g, Acticarb PS1300F) was suspended in the solution. The solution was poured into a silicone mould and allowed to dry on a hot plate at 50° C. in a fumehood overnight, to make an electrode of thickness slightly >1 mm.

Example 24 (3TF59). Graphite/Poly(DADMAC) Binder

Poly(diallyldimethylammonium) chloride (4.1283 g, 20% w/w solution, M.W. 200-350 kDa, Sigma-Aldrich) was mixed with methanol (9.1044 g) then graphite (4.1775 g, Asbury Carbons Microfyne) was suspended in the solution. The solution was poured into a silicone mould and allowed to dry on a hot plate at 50° C. in a fumehood overnight, to make an electrode of thickness slightly >1 mm.

Example 25 (3TF63). Expanded Graphite/Poly(DADMAC) Binder

Poly(diallyldimethylammonium) chloride (4.0379 g, 20% w/w solution, M.W. 200-350 kDa, Sigma-Aldrich) was mixed with methanol (14.3454 g) then expanded graphite (1.8162 g, SGL EG30) was suspended in the solution. The solution was poured into a silicone mould and allowed to dry on a hot plate at 50° C. in a fumehood overnight, to make an electrode of thickness slightly >1 mm.

Example 26 (3TF66). Activated Carbon/Carbon Black/Poly(DADMAC) Binder

Poly(diallyldimethylammonium) chloride (8.0083 g, 20% w/w solution, M.W. 200-350 kDa, Sigma-Aldrich) was mixed with water (11.6067 g), then carbon black (0.3965 g, Ketjenblack, EC300J) was suspended in the solution, followed by activated carbon (3.5993 g, Acticarb PS1300F). The solution was poured into a silicone mould and allowed to dry on a hot plate at 50° C. in a fumehood overnight, to make an electrode of thickness slightly >1 mm.

Example 27 (3TF56). Expanded Graphite/PVDF-HFP

PVDF-HFP (1.1092 g, Sigma Aldrich, 400 kDa) was dissolved in NMP (21.9696 g) then expanded graphite (2.8724 g, SGL EG30) was suspended in the resulting solution. The suspension was poured into a silicone mould and allowed to dry on a hot plate at 50° C. in a fumehood overnight, to make an electrode of thickness slightly >1 mm.

Example 28 (3TF60). Expanded Graphite/PVDF-HFP/Poly(DADMAC)

Poly(diallyldimethylammonium) chloride (4.7052 g, 20% w/w solution, M.W. 200-350 kDa, Sigma-Aldrich) was mixed with methanol (2.8161 g) and poured onto a premade PVDF-HFP bound electrode (1.6825 g, 3TF56). The coated electrode was left to dry on a hot plate at 50° C. in a fumehood overnight, to make an electrode of thickness slightly >1 mm.

Example 29. Performance of Membranes

The modified substrates were characterised by electrochemical impedance spectroscopy (EIS) to determine their resistance. Electrochemical impedance spectroscopy measurements were undertaken on Biologic potentiostat (SP-300) in an equipped battery comprising an anode, spacer, membrane, cathode and electrolyte. The measurement scans were conducted within a frequency range of 7 MHz to 100 mHz at the open-circuit potential with a 10 mV AC perturbation. The bromine crossover experiment evaluated the percentage of bromine that diffused through the semipermeable barrier from 0.4 wt. % bromine in water to water. The reduction in bromine in the 0.4 wt. % bromine solution was determined by UV-Vis spectroscopy. The resistance measurement for the cell and the bromine crossover evaluation for the modified barriers are shown in Tables 2 and 3, respectively.

TABLE 2

Resistance of modified PVC and filter paper membranes.

| Semipermeable barrier | Resistance/Ω |
| --- | --- |
| without membrane | 0.308 |
| Filter paper (Whatman 2) | 0.340 |
| Untreated PVC membrane | 0.371 |
| Example 5b (DN477013-2) | 0.556 |
| Example 4b (DN477015-2) | 0.381 |

TABLE 3

Bromine crossover of PVC and modified filter paper membranes.

| Semipermeable barrier | Br2 crossover over 5 hours |
| --- | --- |
| Filter paper (Whatman 2) | 22.55% |
| Untreated PVC membrane | 13.29% |
| Filter paper (Whatman 6) | 16.97% |
| Example 10b (DN477023-2) | 6.73% |
| Example 11b (DN477025-2) | 13.84% |

Performance of Polymer Modified Electrodes

Example 30. Non-Aqueous Test Cell Method

Figure 18:
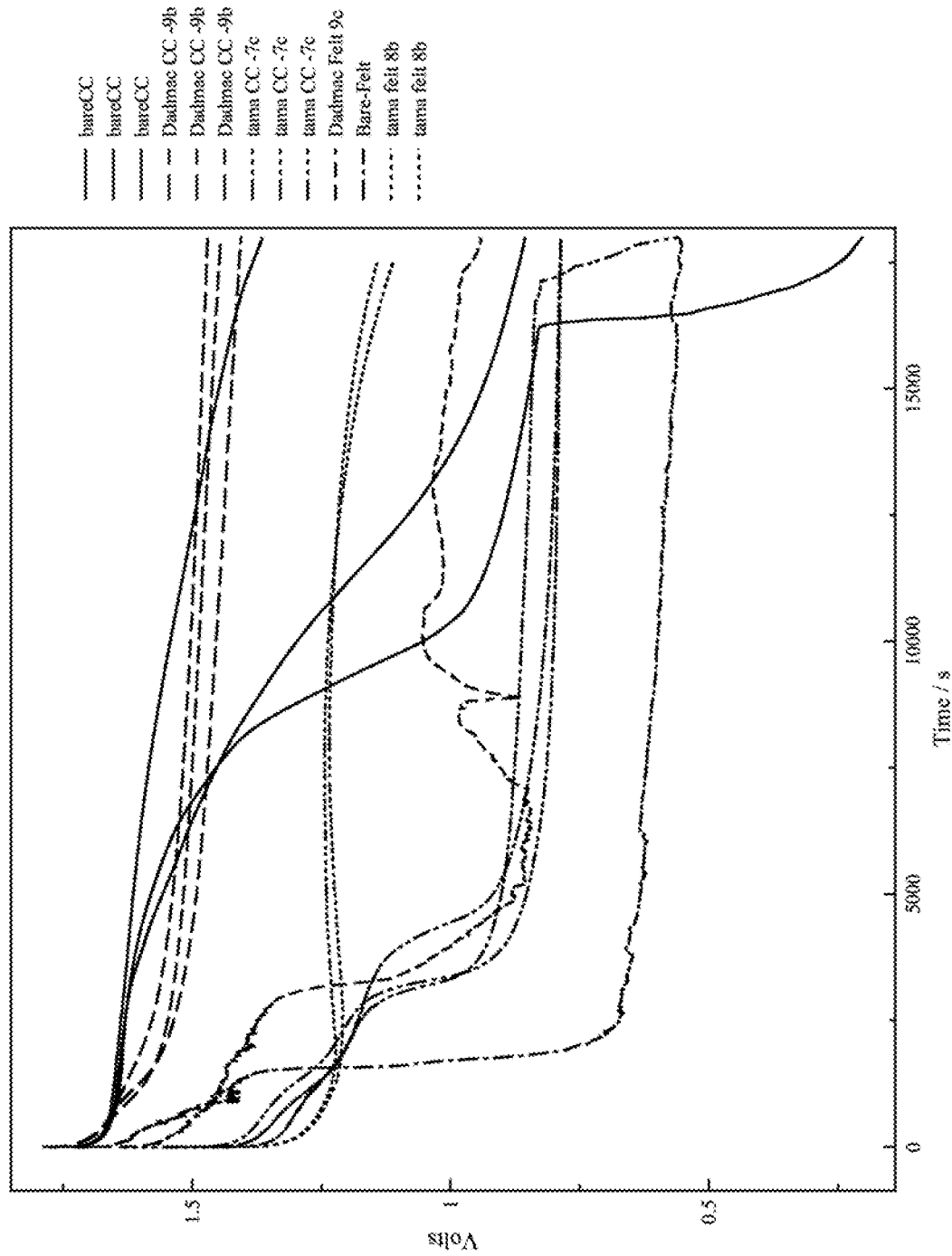
FIG. 18. Performance of modified electrodes in accordance with Example 30.
Figure 19:
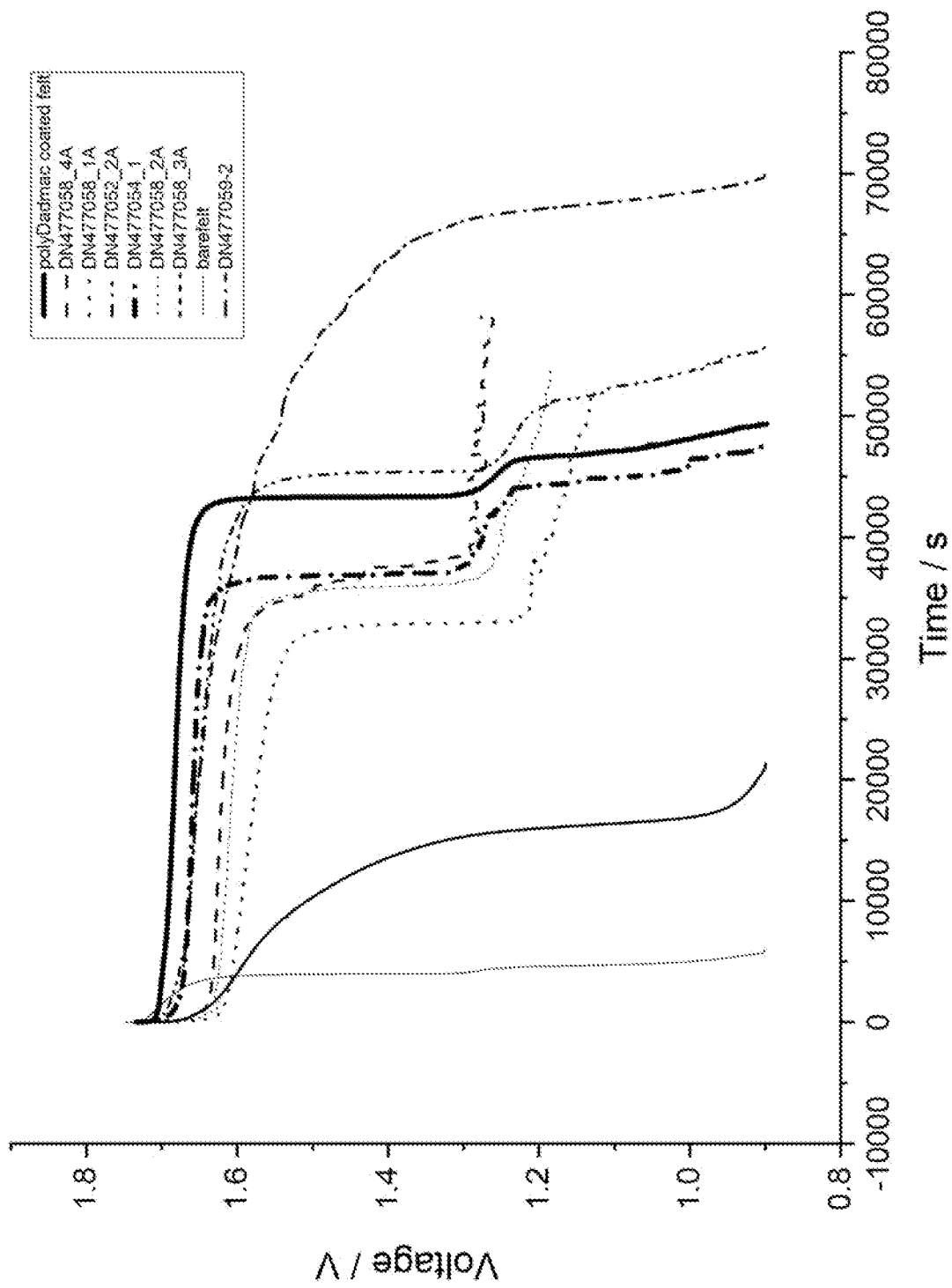
FIG. 19. Performance of modified electrodes in accordance with Example 31.
Figure 20:
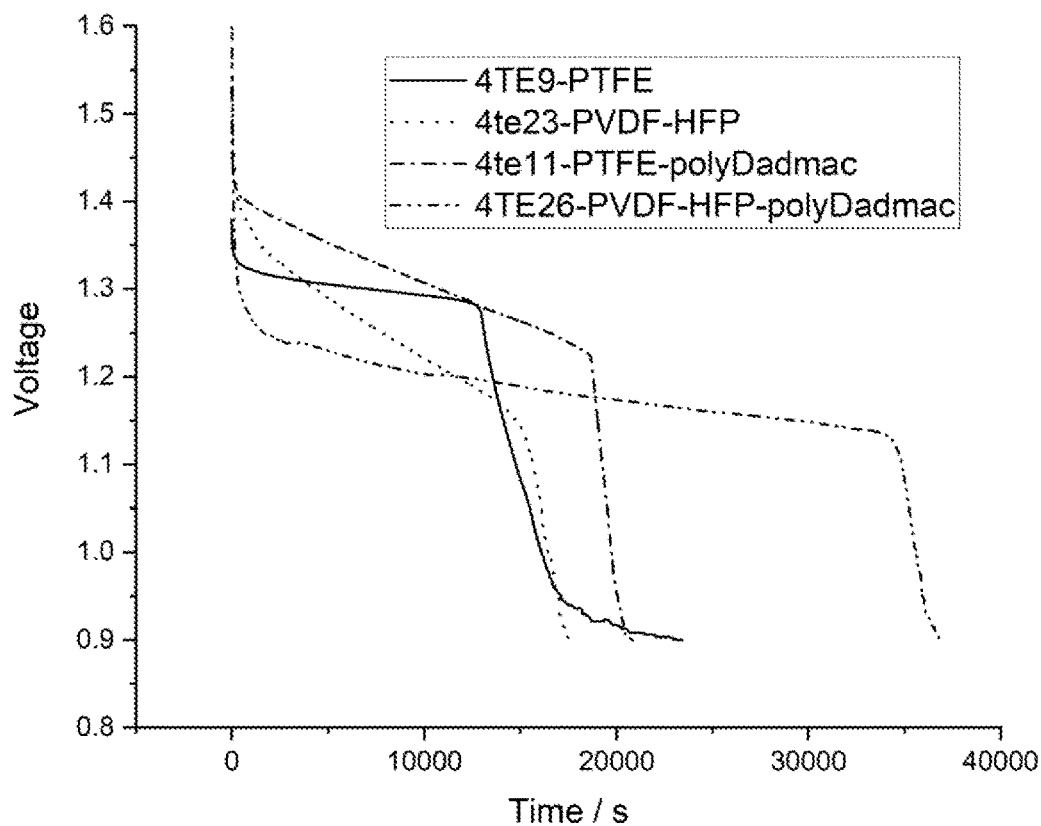
FIG. 20. Performance of modified electrodes in accordance with Example 31.
Figure 21:
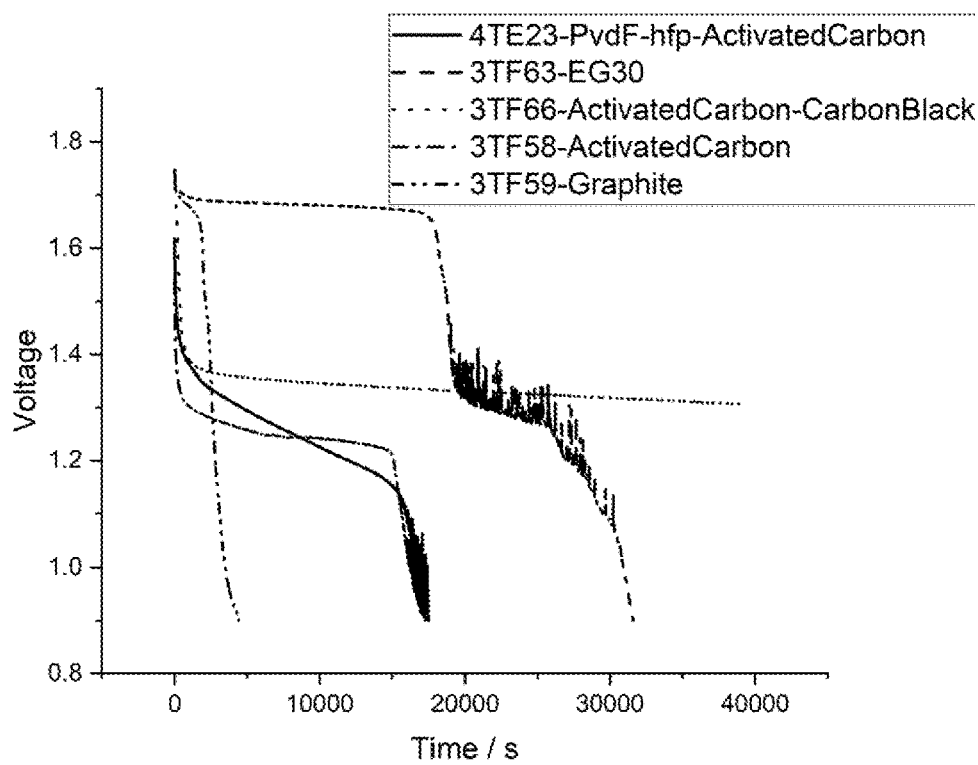
FIG. 21. Performance of modified electrodes in accordance with Example 31.
Figure 22:
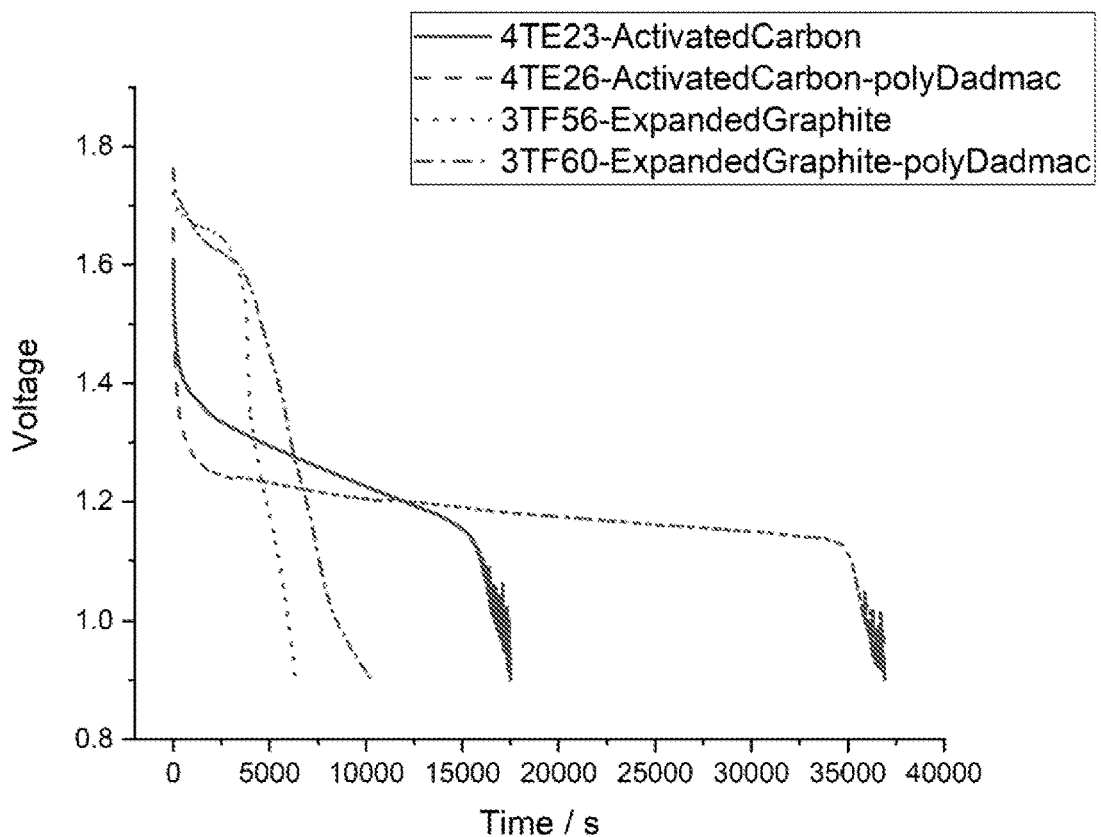
FIG. 22. Performance of modified electrodes in accordance with Example 31

Each cell contained a zinc metal anode. The electrolyte is acetonitrile (12 g) saturated with zinc bromide (8 g), and lithium perchlorate (1.19 g) added as a supporting electrolyte. The cathode was varied depending on the study. The cell was assembled in a CR2032 stainless steel test cell, with a stainless steel spring and a Whatman 2 filter acting as a separator. These cells were all treated the same way. Charge at 1.9V for 5 minutes (10 mA, maximum current) and then monitored by open circuit voltage. The drop in voltage is associated with the bromine cross-over causing self-discharge. Hence the longer the voltage stays higher the less bromine crossover occurs. Results are presented in FIG. 18.

Example 31. Aqueous Test Cell Method

The cell was assembled in a CR2032 stainless steel test cell, with a stainless steel anode. The electrolyte contained water (11.61 g) and zinc bromide (7.11 g). The separator/membrane was a microporous membrane (Amer-sil). The cathode was a 14 mm diameter cut carbon felt (modified depending on sample) or carbon cake (modified depending on sample) pressed against a current collector (Lingstat LINQSTAT XVCF 200Ω☐). The cell was charged at maximum of 5 mA to 0.5 mAh, and then very gently discharged at 2 μA to determine the duration of discharge. The drop in voltage is associated with the bromine cross-over causing self-discharge. Hence the longer the voltage stays higher the less bromine crossover occurs. Results are presented in FIGS. 19 to 22.

Example 32 (4TE27). High-Energy Aqueous Test Cell Method

Figure 23:
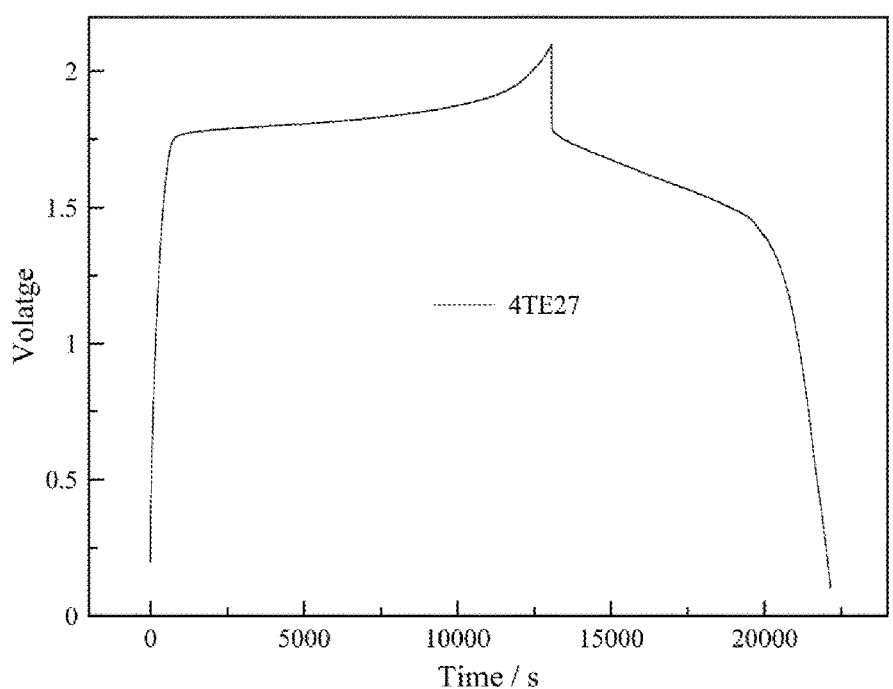
FIG. 23. Performance of modified electrodes in accordance with Example 32.

The cell was assembled in a CR2032 stainless steel test cell, containing a stainless steel anode. The electrolyte contained zinc bromide (10.19 g, anhydrous), made up to 12.5 mL volume with water resulting in a 3.4 M zinc bromide solution. The separator/membrane was an Amer-sil microporous membrane. The cathode was a 14 mm diameter cut sample from Example 20 4TE11 pressed against a Lingstat (LINQSTAT XVCF 200Ω☐) current collector. The cell was charged at maximum at a current density of 0.6 Adm$^{-2}$, to 2.18 Ahdm$^{-2}$ with an effective cell thickness of 2.2 mm (all dimensions are combined electrode and separator dimensions). The result is presented in FIG. 23. A summary of the cell performance is set out in Table 4 below.

TABLE 4

Performance of high energy aqueous test cell.

|  | Example 25 | Units |
| --- | --- | --- |
| Current Density | 0.6 | A dm$^{-2}$ |
| Charge Capacity | 1.9 | Ah dm$^{-2}$ |
| Thickness | 0.023 | dm |

TABLE 4-continued

Performance of high energy aqueous test cell.

| | Example 25 | Units |
|---|---|---|
| Volumetric Capacity | 83.9 | Ah dm$^{-3}$ |
| Nominal Voltage | 1.4 | V |
| Energy Density | 117.4 | Wh dm$^{-3}$ |
| Current Density | 26.1 | A dm$^{-3}$ |
| Power Density | 36.5 | Wdm$^{-3}$ |

The invention claimed is:

1. A battery, comprising
an anode,
a cathode,
an electrolyte disposed between the anode and the cathode,
a halogen in contact with the cathode, wherein the cathode comprises a cathode active layer, and
a metal in contact with the anode,
wherein a polymeric halogen sequestering agent (HSA) is distributed in the cathode active layer, and wherein the polymeric HSA is a polymer or co-polymer comprising a monomer of Formula (I):

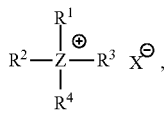

wherein
Z is N, P or S,
$R^1$ is allyl or vinyl,
$R^2$ is selected from the group consisting of allyl, vinyl, and optionally substituted branched or unbranched $C_1$ to $C_{18}$ alkyl, and X$^-$ is Cl$^-$, I$^-$, Br$^-$, F$^-$, SCN$^-$, OCN$^-$, OH$^-$, $C_2O_4^{2-}$, HCOO$^-$, HCO$_3^-$, CO$_3^{2-}$, OCl$^-$, OBr$^-$, BrO$_3^-$, ClO$_3^-$, SO$_3^{2-}$, NO$^{2-}$, IO$_3^-$, H$_2$PO$_4^-$, HPO$_4^{2-}$, SO$_4^-$, NO$_3^-$, ClO$_4$, bis(trifluoromethylsulfonyl)-imide, bis(fluorosulfonyl)imide, hexafluorophosphate, tetrafluoroborate, tris(pentafluoro)trifluorophosphate, acetate, propionate, pentanoate, hexanoate, or a combination thereof, or
$R^2$ and X$^-$ are absent, and
$R^3$ and $R^4$ are each independently selected from allyl, vinyl, optionally substituted branched or unbranched $C_1$ to $C_{18}$ alkyl, or
$R^3$ and $R^4$ are joined to form a 4, 5, or 6-membered ring together with Z, optionally comprising one or more heteroatoms selected from the group consisting of O, P and N, wherein said ring is optionally substituted,
wherein each optional substituent is independently selected from the group consisting of allyl, vinyl, branched and unbranched $C_1$ to $C_{18}$ alkyl, Cl, Br, I, F, —OR$^5$, —NR$^5$R$^6$, —N$^+$R$^5$R$^6$R$^7$, —SR$^5$, —COOR$^5$, and carbonyl,
wherein R$^5$, R$^6$ and R$^7$ are each independently selected from branched or unbranched $C_1$ to $C_{18}$ alkyl or H, and any two of R$^5$, R$^6$ and R$^7$ are optionally joined to form a 4, 5, or 6-membered ring together with N.

2. The battery of claim 1, wherein the moiety capable of sequestering the halogen is a quaternary ammonium halide group, a phosphonium halide group, or a sulfonium halide group.

3. The battery of claim 1, wherein the moiety capable of sequestering the halogen is a quaternary ammonium halide group.

4. The battery of claim 1, wherein the cathode active layer comprises a carbon material having a surface area greater than 70 cm$^2$/cm$^3$.

5. The battery of claim 1, wherein the cathode active layer comprises carbon felt, carbon foam, packed carbon powder, expanded graphite, aerogel carbon, xerogel carbon, or sol-gelated carbon.

6. The battery of claim 1, wherein the cathode active layer comprises carbon felt or packed carbon powder.

7. The battery of claim 6, wherein the carbon powder is activated carbon, carbon black, expanded graphite, graphite, or a combination of two or more thereof.

8. The battery of claim 1, wherein the cathode active layer comprises packed carbon powder and does not comprise a polymeric binder.

9. The battery of claim 1, wherein the metal is Zn.

10. The battery of claim 1, wherein the halogen is bromine.

11. The battery of claim 1, wherein Z is N.

12. The battery of claim 1, wherein oxidant crossover is reduced by up to 70% over 5 hours compared to an equivalent battery without a polymeric HSA, as measured by discharge of the battery.

13. The battery of claim 1 wherein Z is P or S.

* * * * *